US011853228B1

(12) United States Patent
Sandberg

(10) Patent No.: US 11,853,228 B1
(45) Date of Patent: Dec. 26, 2023

(54) PARTIAL-ADDRESS-TRANSLATION-INVALIDATION REQUEST

(71) Applicant: Arm Limited, Cambridge (GB)

(72) Inventor: Andreas Lars Sandberg, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/837,108

(22) Filed: Jun. 10, 2022

(51) Int. Cl.
*G06F 12/1045* (2016.01)
*G06F 12/0802* (2016.01)

(52) U.S. Cl.
CPC ...... *G06F 12/1045* (2013.01); *G06F 12/0802* (2013.01); *G06F 2212/60* (2013.01)

(58) Field of Classification Search
CPC ............. G06F 12/0802; G06F 12/1045; G06F 2212/60
See application file for complete search history.

(56) References Cited

U.S. PATENT DOCUMENTS

| 5,710,903 | A | * | 1/1998 | Horiuchi | G06F 12/1027 |
| | | | | | 711/E12.061 |
| 10,761,876 | B2 | | 9/2020 | Bak et al. | |
| 2015/0242319 | A1 | * | 8/2015 | Evans | G06F 12/1036 |
| | | | | | 711/207 |
| 2016/0140048 | A1 | | 5/2016 | Mukherjee et al. | |
| 2019/0332550 | A1 | | 10/2019 | Norman et al. | |
| 2020/0218665 | A1 | * | 7/2020 | Swaine | G06F 12/0864 |
| 2021/0109867 | A1 | | 4/2021 | Wu | |
| 2023/0064603 | A1 | * | 3/2023 | Blasco | G06F 12/0811 |

FOREIGN PATENT DOCUMENTS

WO 2021/191575 9/2021

OTHER PUBLICATIONS

Park, C.H. et al., "Every Walk's a Hit: Making Page Walks Single-Access Cache Hits" ASPLOS, Proceedings of the 27th ACM International Conference on Architectural Support for Programming Languages and Operating Systems, Feb. 28, 2022-Mar. 4, 2022. (14 pages).
Vougioukas, I., "How about a short walk?" A short walk through memory translation optimisations—Research Articles—Arm, Mar. 10, 2022 (10 pages).
International Search Report and Written Opinion of the International Searching Authority for PCT/GB2023/051371 dated Sep. 1, 2023, 15 pages.

* cited by examiner

*Primary Examiner* — Aracelis Ruiz
(74) *Attorney, Agent, or Firm* — NIXON & VANDERHYE P.C.

(57) ABSTRACT

Partial-address-translation-invalidation request to cause cache control circuitry to: identify whether a given cache entry of the address translation cache is a target cache entry to be invalidated, wherein the target cache entry comprises a cache entry for which the address translation data comprises partial address translation data indicative of an address of the next level page table specified by a table address of a target page table entry when used as the branch page table entry; and trigger an invalidation of the given cache entry when the given cache entry is identified to be the target cache entry. The given cache entry is permitted to be retained when the given cache entry provides full address translation data indicative of an address of a corresponding region of address space corresponding to an output address specified by the target page table entry when used as the leaf page table entry.

18 Claims, 11 Drawing Sheets

PARTIAL-ADDRESS-TRANSLATION-INVALIDATION REQUEST

BACKGROUND

The present technique relates to the field of data processing.

In data processing systems, input addresses may be translated into output addresses using address translation data dependent on page table entries of a page table structure in memory. The page table structure may be a multi-level page table structure, with each level of the table structure either specifying output addresses for the address translation, or addresses of next-level page tables in the multi-level page table structure. This allows the address translation data to be stored across multiple discrete regions of memory (e.g. without needing to allocate a contiguous block of memory large enough to hold a linear page table with sufficient entries to cover the entire address space). An address translation cache may also be provided, to store a subset of the address translation data.

SUMMARY

Viewed from one example, the present technique provides an apparatus comprising:
an address translation cache comprising a plurality of cache entries, each cache entry to store address translation data dependent on one or more page table entries of a multi-level page table structure in memory, wherein each page table entry of the multi-level page table structure is usable as at least one of:
  a branch page table entry that specifies a table address of a next level page table; and
  a leaf page table entry that specifies an output address for an address translation mapping for a corresponding region of address space; and
cache control circuitry responsive to a partial-address-translation-invalidation request to:
  perform an invalidation lookup operation to identify whether a given cache entry of the address translation cache is a target cache entry to be invalidated, wherein the target cache entry comprises a cache entry for which the address translation data comprises partial address translation data indicative of an address of the next level page table specified by the table address of a target page table entry when used as the branch page table entry; and
  trigger an invalidation of the given cache entry when the given cache entry is identified to be the target cache entry,
said partial-address-translation-invalidation request indicating that the given cache entry is permitted to be retained when the given cache entry provides full address translation data indicative of an address of the corresponding region of address space corresponding to the output address specified by the target page table entry when used as the leaf page table entry.

Viewed from another example, the present technique provides a method comprising:
storing, in each of a plurality of cache entries of an address translation cache, address translation data dependent on one or more page table entries of a multi-level page table structure in memory, wherein each page table entry of the multi-level page table structure is usable as at least one of:
  a branch page table entry that specifies a table address of a next level page table; and
  a leaf page table entry that specifies an output address for an address translation mapping for a corresponding region of address space; and
in response to a partial-address-translation-invalidation request:
  performing an invalidation lookup operation to identify whether a given cache entry of the address translation cache is a target cache entry to be invalidated, wherein the target cache entry comprises a cache entry for which the address translation data comprises partial address translation data indicative of an address of the next level page table specified by the table address of a target page table entry when used as the branch page table entry; and
  triggering an invalidation of the given cache entry when the given cache entry is identified to be the target cache entry,
said partial-address-translation-invalidation request indicating that the given cache entry is permitted to be retained when the given cache entry provides full address translation data indicative of an address of the corresponding region of address space corresponding to the output address specified by the target page table entry when used as the leaf page table entry.

Viewed from another example, the present technique provides a computer program comprising instructions which, when executed on a host data processing apparatus, control the host data processing apparatus to provide:
address translation logic to perform address translations based on a multi-level page table structure in memory, the address translation logic being configured to maintain an address translation data structure comprising a plurality of data structure entries, each data structure entry to store address translation data dependent on one or more page table entries of the multi-level page table structure, wherein each page table entry of the multi-level page table structure is usable as at least one of:
  a branch page table entry that specifies a table address of a next level page table entry; and
  a leaf page table entry that specifies an output address for an address translation mapping for a corresponding region of address space; and
control logic responsive to a partial-address-translation-invalidation request to:
  perform an invalidation lookup operation to identify whether a given data structure entry of the address translation data structure is a target data structure entry to be invalidated, wherein the target data structure entry comprises a data structure entry for which the address translation data comprises partial address translation data indicative of an address of the next level page table specified by the table address of a target page table entry when used as the branch page table entry; and
  trigger an invalidation of the given data structure entry when the given data structure entry is identified to be the target data structure entry,
said partial-address-translation-invalidation request indicating that the given data structure entry is permitted to be retained when the given data structure entry provides full address translation data indicative of an address of the corresponding region of address space corresponding to the output address specified by the target page table entry when used as the leaf page table entry.

Viewed from another example, the present technique provides a non-transitory computer-readable storage medium storing the above computer program. In an alternative example, the computer-readable storage medium could be a transitory computer-readable storage medium.

Further aspects, features and advantages of the present technique will be apparent from the following description of examples, which is to be read in conjunction with the accompanying drawings.

DESCRIPTION OF EXAMPLES

Figure 1:
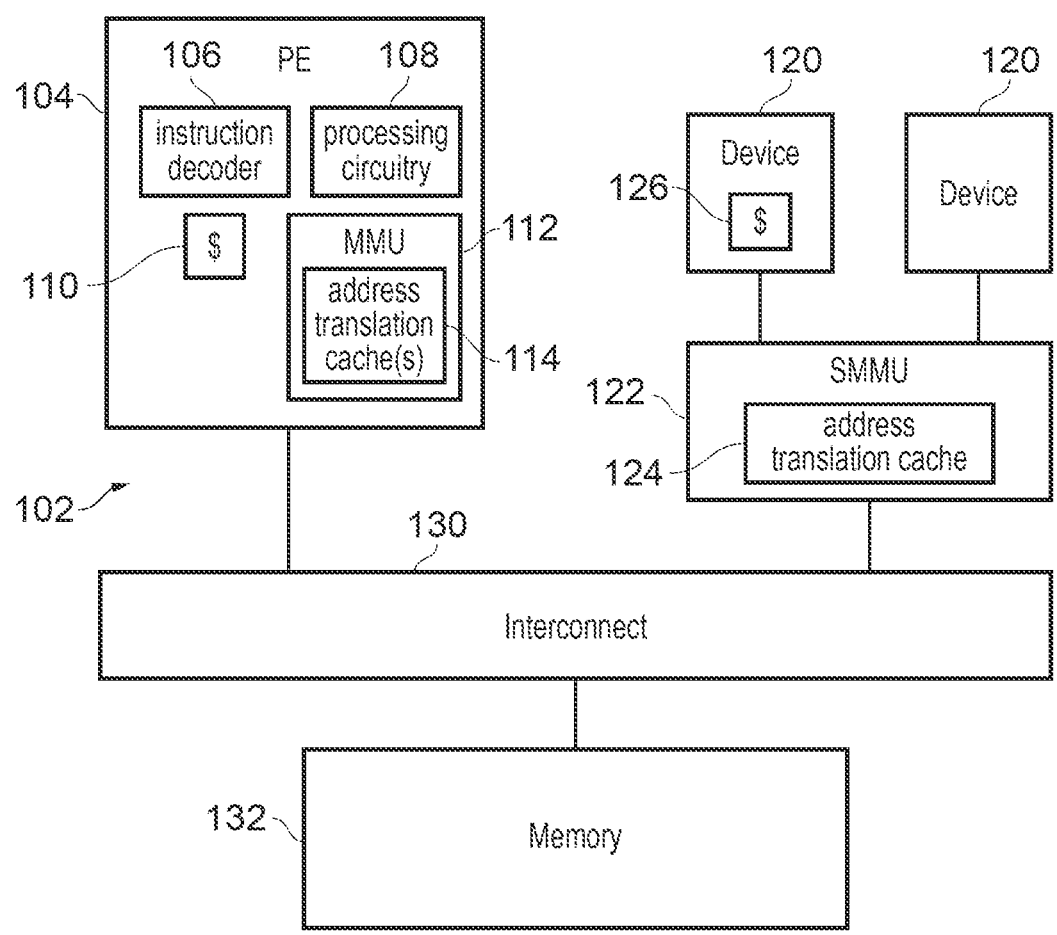
FIGS. 1 and 2 illustrate a data processing system within which the present technique may be implemented.

Before discussing example implementations with reference to the accompanying figures, the following description of example implementations and associated advantages is provided.

In accordance with one example configuration there is provided an apparatus comprising an address translation cache comprising a plurality of cache entries, each cache entry to store address translation data dependent on one or more page table entries of a multi-level page table structure in memory, wherein each page table entry of the multi-level page table structure is useable as at least one of:

a branch page table entry that specifies a table address of a next level page table; and a leaf page table entry that specifies an output address for an address translation mapping for a corresponding region of address space.

The apparatus also comprises cache control circuitry responsive to a partial-address-translation-invalidation request to:

perform an invalidation lookup operation to identify whether a given cache entry of the address translation cache is a target cache entry to be invalidated, wherein the target cache entry comprises a cache entry for which the address translation data comprises partial address translation data indicative of an address of the next level page table specified by the table address of a target page table entry when used as the branch page table entry; and trigger an invalidation of the given cache entry when the given cache entry is identified to be the target cache entry.

The partial-address-translation-invalidation request indicates that the given cache entry is permitted to be retained when the given cache entry provides full address translation data indicative of an output address of the corresponding region of address space corresponding to the address specified by the target page table entry when used as the leaf page table entry.

As explained above, page tables are used to define address translation data for translating input addresses into output addresses. For example, input addresses could be addresses in an input address space, while output addresses could be addresses in an output address space that is different to the input address space. However, it should be appreciated that it is also possible to translate an input address in one address space into an output address in the same address space. Typically, a large amount of address translation data needs to be defined in the page tables, in order to provide translations for all accessible pages in memory. Hence, finding a contiguous region of memory large enough to store all of the address translation data can be difficult.

To address this issue, the address translation data can be defined in a set of nested page tables referred to as a multi-level page table structure. In a multi-level page table structure, each page table entry can be interpreted as specifying either an output address for an address translation for a corresponding region of address space (in which case the page table entry is used as a leaf page table entry), or a table address of a next level page table (in which case the page table entry is used as a branch page table entry).

It should be noted that while, in some examples, each page table entry in the multi-level page table structure comprises either a branch page table entry or a leaf page table entry (not both), in some other examples a given page table entry may be useable as both a branch page table entry and a leaf page table entry. For example, in some implementations one or more page table entries in a given page table of the multi-level page table structure may be defined by software as "self-referencing", such that they provide a pointer which corresponds to the address of the given page table itself. This means that the same page table may be used at more than one level of the lookup of the multi-level page table structure. Hence, if a self-referencing entry is present at the penultimate level of the lookup of the page table structure, the same page table entry may be used as both a branch page table entry (when referenced at the penultimate level) and a leaf page table entry (when referenced at the final level of the lookup). In another example, the self-referencing entry may be at the first level of the lookup (e.g. this could be referred to as level 0, at L0). In this example, addresses can then be constructed that "dereference" that entry. For example, consider a system with four levels of lookup (e.g. L0, L1, L2 and L3). When dereferencing the self-referencing entry once, level 2 (L2) page tables entries containing table addresses end up being treated as level 3 (L3) page tables containing output addresses, while the original L3 entries are treated as data pages. The self-referencing entry can be dereferenced multiple times to access other levels. For example, the L2 tables would be treated as data pages when the entry is dereferenced twice.

Whether a page table is self-referencing depends on the particular values of the pointers defined by software in the entries of that page table. The hardware may not be able to know whether a table is self-referencing—e.g. an address translation cache may end up caching information from the same page table multiple times corresponding to different levels of the page table lookup.

Leaf page table entries can be thought of as the final level of the page table structure (although, in practice, a leaf page table entry can also be found at a higher level of the table, in an implementation which supports early termination of page table walks based on a leaf entry indicator in a higher-level page table entry), and provide the output address corresponding to a particular input address to be translated. Branch page table entries, on the other hand, do not provide an output address, but instead point to (e.g. provide a table address of) a further page table at a subsequent level of the multi-level table structure. The further page table may itself contain leaf page table entries or branch page table entries.

The apparatus of the present technique comprises an address translation cache. The address translation cache is storage circuitry which stores address translation data corresponding to a subset of the page table entries of the multi-level page table structure, allowing subsequent translations which use that address translation data to be performed with reduced latency. The address translation cache may store full address translations (e.g. it may be a translation lookaside buffer, TLB) to allow input addresses to be translated into output addresses without accessing the page tables in memory. Alternatively, the address translation cache may store partial address translation data (e.g. it may be a page walk cache, PWC) to reduce the number of memory accesses that are needed to translate a given input address (since the partial address translation data may allow one or more levels of the multi-level page table structure to be skipped). Hence, the full address translation data specifies the output address specified by a leaf page table entry (or information indicative of the output address) corresponding to a given input address. On the other hand, the partial address translation data specifies the table address specified by a branch page table entry corresponding to a given input address (or information indicative of the table address). Further, some address translation caches store both full address translation data and partial address translation data. Other implementations may have separate address translation caches for caching full address translation data and partial address translation data respectively. The address translation cache may take any form—e.g. it could be a fully associative, direct-mapped or set-associative cache—and comprises a plurality of entries, each storing address translation data dependent on one or more page table entries of the multi-level page table structure.

The present technique provides a partial-address-translation-invalidation (PATI) request, which is a request for cache control circuitry to invalidate partial address translation data stored in the address translation cache, without invalidating full address translation data. In particular, the cache control circuitry is responsive to the PATI request to perform an invalidation lookup to identify any target cache entries in the address translation cache which store partial address translation data corresponding to one or more target page table entries used as the branch page table entry, and to trigger an invalidation of those target cache entries. For example, the target cache entries may be invalidated by clearing a "valid" bit (or setting the valid bit to a value that indicates that the entry is invalid), so that the partial address translation data can no longer be used in performing address translations. However, the PATI request also indicates that the cache control circuitry is permitted to retain any entry which provides full address translation data (corresponding to one or more target page table entries used as the leaf page table entry), even if the entry was identified or could otherwise be identified as a target cache entry in the invalidation lookup.

One might think that providing support for a PATI request that invalidates partial address translation data without invalidating full address translation data is unnecessary, since if an address translation changes (e.g. if the address mapping from input address to output address changes), this typically involves a change to the output address stored in the leaf page table entry. Hence, one would expect that the full translation data would need to be invalidated, not just the partial address translation data. However, the inventors of the present technique realised that there may be instances in which the partial address translation for a given address mapping might change, while the full address translation data (e.g. the output address) stays the same. This could be, for example, due to a re-arrangement of the page tables, or a migration of the page tables from one part of the memory to another. In this case, the table addresses of each of the page tables might have changed without the output addresses changing. Hence, in such cases, any full address translation data held in the address translation cache is still correct, even if the partial address translation data stored in the address translation cache is no longer up-to-date. In this case, the inventors realised that it is not necessary to invalidate the full address translation data.

Hence, a PATI request is provided which allows the partial address translation data to be invalidated without invalidating the full address translation data. This allows any full translation data stored in the address translation cache to remain available for use in performing address translations, reducing the latency associated with those translations (since the output address does not need to be fetched from memory each time). Therefore, supporting the PATI request helps to improve performance in comparison to systems not supporting a PATI request.

In some examples, the partial-address-invalidation request specifies a table-level identifier indicative of a subset of page table levels of the multi-level page table structure, and the target page table entry comprises a page table entry at one of the subset of page table levels specified by the table-level identifier.

For a given address translation mapping (e.g. a translation of a given input address to a given output address), the partial address translation data stored in the address translation cache can indicate a table address of a page table at any level of the multi-level page table structure, although in practice it may not be needed to cache a table address of the top level page table (e.g. level 0), since the top level page table address may already be accessible from a base address register. Hence, in some examples, the partial address translation data indicates a table address of a page table at any level of the multi-level page table structure other than the top level.

The inventors realised that, in some instances, not all of the partial address translation data associated with a given address translation mapping needs to be invalidated using a PATI request. For example, in some instances only a subset of the branch page tables used to identify the address translation mapping are remapped (e.g. the structure of only some levels of the multi-level page table structure is altered). Hence, the inventors realised that it would be useful to be able to invalidate partial address translation data corresponding to a subset of the levels of the multi-level page table structure, without invalidating the partial address translation data associated with other levels. Hence, in this example, a table-level identifier can be specified by the PATI request, indicating that only partial address translation data corresponding to the page table level or levels specified by the table-level identifier should be invalidated (e.g. partial address translation data corresponding to levels other than those identified by the table-level identifier are permitted to be retained).

Other examples may not support such a table-level identifier and could provide a PATI request which targets partial address translations associated with target page table entries at any level.

In some examples, the apparatus comprises processing circuitry responsive to a partial-address-translation-invalidation instruction to issue the partial-address-translation-invalidation request.

Hence, in this example an instruction may be defined in the instruction set architecture (ISA) to cause the PATI request to be issued to the cache control circuitry of the address translation cache. For example, the instruction could be a dedicated PATI instruction, or it could be a more general address translation invalidation instruction comprising a parameter (e.g. in the instruction encoding or in a control register) distinguishing whether the address translation instruction should act as a PATI instruction or another type of address translation instruction.

In this example, the processing circuitry may be configured to perform data processing in response to instructions decoded by an instruction decoder. The format of the instruction encoding and the functionality represented by each instruction may be defined according to an instruction set architecture (ISA). The ISA represents the agreed framework between the hardware manufacturer who manufactures the processing hardware for a given processor implementation and the software developer who writes code to execute on that hardware, so that code written according to the ISA will function correctly on hardware supporting the ISA.

When designing an ISA, there can be a significant design challenge in determining the set of processing operations to be supported in the ISA and the encoding of the instructions to represent those operations. In principle there may be a wide variety of different types of processing operation which may be useful to the support for some program applications, but within the encoding space available it may not be possible to represent every possible data processing operation which could be useful to a particular programmer. There may be a restriction on the number of bits available for encoding each instruction, because increasing the instruction bit width would incur additional circuit area and power consumption each time the instruction is stored anywhere within the processor or is transferred over wired processing paths between logic elements. To limit hardware and power costs, an instruction bit width may be selected which, when taking account of the need to encode operand values through register specifiers and/or immediate values, leaves an opcode space which is insufficient to represent every possible data processing operation which could be desired. Therefore, a design decision would need to be made as to which subset of operations are the most important to support, and any operations which cannot be supported in a single instruction would then have to be performed using sets of multiple instructions with equivalent functionality when executed together.

Accordingly, one might think that providing an instruction in the ISA that triggers the processing circuitry to issue the PATI request—particularly if the instruction is a dedicated PATI instruction—is a waste of encoding space that could be used to define other, more useful instructions, and hence might consider the provision of a dedicated PATI instruction to be counter-intuitive. However, the inventors of the present technique realised that in some situations—for example, where low latency in address translations is important, and where the structure of the multi-level address translation table is expected to frequently be updated without updating the address translation mappings themselves, the PATI instruction may be valuable enough to justify the cost of implementing the instruction in the ISA.

In some examples, the partial-address-translation-invalidation request comprises a write request requesting writing of a partial-address-translation-invalidation command to a region of memory accessible to the cache control circuitry.

For example, the PATI request may request that a PATI command is written to a command queue in the memory, and the cache control circuitry may monitor the command queue to identify any new commands that have been issued, and may be responsive to the PATI command being written to the command queue to perform the PATI process described above. According to this approach, the PATI request can be implemented without necessarily needing to define a PATI instruction in the ISA, which avoids taking up encoding space in the ISA (although it should be appreciated that it is possible to define a PATI instruction that is translated, by processing circuitry, into a write request). Moreover, this approach can be particularly useful for invalidating partial address translations cached in an address translation cache outside of processor core (e.g. an address translation cache accessible to an I/O MMU (input/output memory management unit), or a device MMU such as the MMU in a GPU (Graphics Processing Unit)). An I/O MMU can also be referred to as a system MMU (SMMU).

In some examples, the cache control circuitry is configured to detect a partial-address-translation-invalidation command issued on a memory system interconnect, wherein the partial-address-translation-invalidation request comprises the partial-address-translation-invalidation command.

Another way in which a PATI command may be issued to the cache control circuitry is via the memory system interconnect (e.g. an interconnect coupling the address translation cache to memory, and which might also couple one or more request agents (such as processing elements) to one another and to the memory. For example, while the PATI request could be issued via the interconnect as the write request discussed above, the interconnect may support a command encoding (different from the encoding used for write requests) that indicates the PATI command (e.g. unlike the write option, the PATI command could be indicated by an encoding on the request channel of the interconnect, rather than by the write data sent on the data channel associated with a write request). Again, the PATI command could be a command issued by processing circuitry in response to execution of a PATI instruction, but this need not necessarily be the case.

In some examples, the apparatus comprises page table walk circuitry responsive to an input address to look up, based on a given table address and an index portion of the input address, a given page table entry in the multi-level page table structure, the page table walk circuitry being configured to determine a size of the index portion to be used for at least one level of the multi-level page table structure in dependence on whether a table merge indication is set.

Page table walk circuitry may be provided in the memory system of the apparatus to locate and retrieve a given output address for translation of a given input address. For example, the page table walk circuitry may derive, from the input address, a number of index portions (or address translation circuitry may derive the index portions and provide these to the page table walk circuitry). Each index portion may, for example, be based on a subset of the bits in the input address. The page table walk circuitry then uses these index portions to "walk" the multi-level page table structure until it reaches the leaf page table entry corresponding to the input address. For example, this walk involves identifying a base address of a given page table (e.g. for the first-level page table, this base address may be obtained from a base address storage location, while for each subsequent page table level, the base address is a table address specified by a branch page table entry of a page table at the preceding level), and using a corresponding index portion to identify a specific page table entry in the given page table. This page table entry (if it is a branch page table entry) is then used, in combination with another index portion, to identify a next-level page table entry, and this process is repeated until a leaf page table entry corresponding to the input address is identified.

The size of each index portion is dependent on the size of the corresponding page table—a page table with more entries requires a larger index portion, in order to allow the page table walk circuitry to identify the required page table entry in that page table. One might expect the index portion corresponding to each level of the multi-level page table structure to remain constant, since one might assume that the size of the page tables at each level would remain constant. However, the inventors realised that it could, in some instances, be useful to be able to merge page tables at two or more levels together. For example, if a large enough contiguous region of address space becomes available for a merged L1/L2 page table to be stored, it may be advantageous to move the L1 and L2 tables to that contiguous region of address space, and merge them together into a single table (e.g. with a shared base address). An entry in the merged L1/L2 page table can then be identified based on an updated base address (obtained from an L0 page table, which would hence need to be updated after the merge) and a larger index portion (e.g. this could be an index portion comprising the previous L1 and L2 portions). This may be advantageous, since it reduces the number of accesses to memory that are required to obtain an address translation, since a table address obtained from the merged L1/L2 page table can be used to identify a L3 page table, hence avoiding a separate lookup of a L2 table.

Hence, the page table walk circuitry may use a table merge indication (e.g. which may be set to a predetermined value when two or more levels of the multi-level page table structure are merged) to determine which bits of the input address should be used to determine each index portion to be used in a page table walk.

The merging of multiple levels of a multi-level page table structure is one example of a situation in which the partial address translation data for a number of input addresses may be updated without updating the full address translation data. For example, in the example given above, partial address translation data indicating the base address of an L2 table may be out of date as now the merged L1/L2 table is used, and partial address translation indicating the base address of the L1 table may be out of date, since the merged L1/L2 page table may be stored in a different location in memory. However, while the structure of the L1/L2 tables has changed, the output address defined for a given input address will not necessarily have been changed. Hence, this is a particular example of a situation in which the PATI request of the present technique can be useful. Similarly, if previously merged tables are split to return from a merged L1/L2 table to separate L1 and L2 tables, this may cause cached partial address translation data to be out of date, It should be appreciated that, while the example given above considers merging of an L1 table and an L2 table, it is also possible to merge other levels of page table, and to merge more than two levels. Moreover, while the merging of page tables has been described above as one example use case for the PATI request, it should be appreciated that there are other possible use cases for the request. For example, defragmentation of memory might, in some cases, lead to one or more page tables needing to be moved from one location in memory to another. Hence, the base addresses (and hence the corresponding partial address translation data) of those tables which are moved may be updated without the associated address translation mappings being updated, even if no merging has taken place. Therefore, the PATI request can be useful even in a system which does not support merging of page table levels.

The target cache entry to be invalidated can be identified in any of a number of ways. In some examples, the partial-address-translation-invalidation request specifies target address information corresponding to the target page table entry.

Hence, the target address information can be used to identify the target cache entries, for example by comparing the target address information with address information associated with each of the cache entries in the address translation cache. This allows partial address translation data associated with particular address translation mappings to be specified by and invalidated in response to the PATI request, avoiding the need to invalidate partial address translations for other address translation mappings where the partial address translation data may still be valid. This helps to improve performance, since the partial address translation data for those other address translation mappings can remain available in the cache for use by address translation circuitry.

In some examples, where the PATI request specifies target address information, the cache control circuitry is responsive to the partial-address-translation-invalidation request to perform a prefetch operation to prefetch updated partial address translation data corresponding to the target address information.

Hence, partial address translation data which has been updated in memory (leading to the need to issue the PATI request) can be updated in the address translation cache, as well as invalidating the out-of-date partial address translation data. This reduces the latency of subsequent address translations which are based on the updated address translation data. The cache control circuitry may perform the prefetch operation after all the partial address translation invalidation operation has been performed (e.g. after the partial address translation data stored in each of the target cache entries has been invalidated), or the cache control circuitry may be capable of performing the prefetch operation and the PATI operation in parallel.

In some examples, the cache control circuitry is configured to restrict the prefetch operation to prefetching of updated partial address translation data for an address corresponding to an invalidated cache entry invalidated in response to the partial-address-invalidation request.

In this way, the prefetch operation performed in response to the PATI request can be restricted so that a cache eviction policy applied by the cache control circuitry (e.g. when seeking to find an entry in the address translation cache for storing prefetched updated address translation data) does not lead to any valid address translation data being evicted from the cache. The updated partial address translation data prefetched in response to the PATI request is thus restricted to data corresponding to addresses for which the corresponding target cache entries were invalidated. This is helpful because the cache eviction policy implemented by the address translation cache may be based on recency of access to the addresses associated with cached translations. The issuing of an invalidation request may reflect solely that a supervising process has reorganised the page table structure, rather than giving any clue as to which addresses are most likely to be accessed again in the near future, so it can be better that prefetches performed in response to the PATI request do not disrupt the normal scheme for managing cache evictions. Therefore, on average, performance can be improved if the address translation data prefetched in response to the PATI request can only replace invalidated address translation data rather than causing eviction of other address translation data not being invalidated.

The target address information specified by the PATI request in these examples can be any address information that allows particular cache entries to be identified as the target cache entries.

In some examples, the address translation mapping is between an input address an input address space and the output address in an output address space, and the target address information comprises input address information.

This can be useful because many address translation caches are indexed and/or tagged based on input addresses to be translated. Hence, identification of the target cache entries based on input address information (information indicative of one or more input addresses) can make use of logic (e.g. comparison logic) that is likely to already be present in the cache and/or the cache control circuitry.

However, the target address information can also take a different form.

In some examples, the address translation mapping is between an input address in an input address space and the output address in an output address space, the target address information comprises an address in the output address space or an address in the further address space translated from the output address space.

For example, the target page table entry may be a page table entry stored in a memory address region corresponding to the address specified by the PATI request (e.g. the target page table entry may be an entry of a page table stored at a memory address region corresponding to the address specified in the PATI request). Indeed, any address which is indicative of target partial address translation data to be invalidated could, in principle, be used as target address information specified by the PATI request. For example, invalidation could be by physical address (PA), with partial address translation data being invalidated if it corresponds to an entry in a page table with a base address corresponding to the specified PA. In another example, invalidation could be by intermediate physical address (IPA), with partial address translation data being invalidated if it corresponds to an entry in a page table with a base address corresponding to the specified IPA. Also, invalidation could be by physical address (PA), with the target page table entry being an entry associated with a guest translation from virtual address (VA) to intermediate physical address (IPA) which corresponds to a memory region corresponding to the specified physical address. This example could be useful when the PATI request is issued by a hypervisor responsible for stage-2 mappings from IPA to PA.

In some examples, the target address information comprises a target range of addresses capable of spanning multiple pages.

Hence, rather than specifying an address indicative of a single page (e.g. a single output address defined in a single leaf page table entry, or a corresponding single input address), a range of target addresses may be specified.

While the above examples consider a PATI request which specifies target address information, this is not essential, and the PATI request could indicate that target cache entries in a different way.

For example, the PATI request may, in some examples, be a global PATI request, indicating that all partial address translation data in the address translation cache should be invalidated. In other examples, the PATI request may be a request to invalidate any partial address translation data corresponding to specific levels of the multi-level page table structure (e.g. identified by the table-level indicator discussed above), independently of the address. In some examples, the partial-address-translation-invalidation request specifies a context identifier, and the cache control circuitry is configured to identify the target cache entry in dependence on the context identifier.

Hence, in this example, the cache control circuitry is arranged to invalidate partial address translation data corresponding to a particular context. For example, the PATI request may specify a context identifier (context ID) without specifying any target address information, or it may specify both target address information and a context identifier, such that the cache control circuitry is caused to identify, as the target cache entries, any cache entries which correspond to both the target address information and the context identifier.

Each of the cache entries in the address translation cache may be associated with a corresponding context identifier, in which case the target cache entries can be identified by the cache control circuitry by comparing the context identifier specified by the PATI request context identifiers associated with the cache entries of the address translation cache.

In some examples, the context identifier is indicative of least one of:
 a virtual machine identifier;
 an address space identifier; and
 a security state.

The context specified identified by a given context identifier can include any instruction execution context which the apparatus is capable of supporting. For example, if the apparatus is capable of supporting execution of virtual machines, the context identifier could include an indication of a particular virtual machine (e.g. a virtual machine identifier, VMID). If the apparatus supports translation from input addresses in multiple different address spaces, the context identifier may include an address space identifier (ASID) to identify a particular one of the multiple address spaces. If the apparatus is capable of operating in a plurality of security states (e.g. a secure state and a less-secure state (also sometimes referred to as a non-secure state, although it will be appreciated that a "non-secure" state may still be supported by some security measures)), the context identifier may also identify a given security state.

The apparatus may be capable of operation in an instruction execution context defined my multiple factors—for example, the apparatus may be capable of supporting any combination of multiple virtual machines, multiple address spaces and multiple security states. Hence, the context identifier could be based on a combination of any two or more of a VMID, an ASID and a security state.

The context identifier could directly identify one or these variables (e.g. the context identifier could be a virtual machine identifier (VMID), an address space identifier (ASID) or an indication of a security state, or could be a concatenation of multiple of these identifiers), or it could indirectly indicate one or a combination of these variables.

In some examples, the partial address translation data is indicative of one of:
the address of the next level page table; and
a further address translated from the address of the next level page table.

For example, the address translation data may identify the address (e.g. it may be all or part of the address), or it may identify a further address translated from that address. For example, in an apparatus supporting translation from virtual addresses to physical addresses via intermediate physical address (e.g. two-stage address translation), the partial address translation data could identify a physical table address (e.g. a table address directly pointing to a next level page table) or an intermediate physical table address (e.g. an address to be translated into the physical table address using stage-two translation tables).

The full address translation data can similarly be represented in multiple ways.

In some examples, the full address translation data is indicative of one of:
the output address; and
a further address translated from the output address.

The techniques discussed above can be implemented in a hardware apparatus which has circuit hardware implementing the address translation cache and cache control circuitry described above (and optionally any of the additional features provided by some examples, such as the address translation circuitry, processing circuitry and page table walk circuitry), which support the PATI request. For example, this could include support for the PATI instruction as part of the native instruction set architecture supported by the decode circuitry and processing circuitry.

However, in another example the same techniques may be implemented in a computer program (e.g. an architecture simulator or model) which may be provided for controlling a host data processing apparatus to provide an instruction execution environment for execution of instructions from target code. The computer program includes address translation program logic to perform address translations based on a multi-level page table structure in memory (e.g. in a memory accessible to the host data processing system), and the address translation program logic maintains an address translation data structure corresponding to the address translation cache described above. The address translation data structure may, when the computer program is executed by the host data processing circuitry, be implemented in the memory (for example), but will be arranged to store a subset of the address translation data (e.g. including partial address translation data) defined in the multi-level page table structure. The program also includes control logic to emulate the cache control circuitry described above, in order to support the PATI request. Hence, the computer program, when executed, controls the host data processing apparatus to provide an instruction execution environment corresponding to the apparatus discussed above. Therefore, the computer program of the present technique can allow a host data processing system to provide all of the technical advantages discussed above.

Hence, such a simulator computer program may present, to target code executing on the simulator computer program, a similar instruction execution environment to that which would be provided by an actual hardware apparatus capable of directly executing the target instruction set, even though there may not be any actual hardware providing these features in the host computer which is executing the simulator program.

This can be useful for executing code written for one instruction set architecture on a host platform which does not actually support that architecture. Also, the simulator can be useful during development of software for a new version of an instruction set architecture while software development is being performed in parallel with development of hardware devices supporting the new architecture. This can allow software to be developed and tested on the simulator so that software development can start before the hardware devices supporting the new architecture are available.

In some particular examples, the computer program may also include instruction decoding program logic for decoding instructions of the target code so as to control a host data processing apparatus to perform data processing. Hence, the instruction decoding program logic emulates the functionality of the instruction decoder of a hardware apparatus as discussed above. The instruction decoding program logic may include support for the PATI instruction described in some of the examples above. However, even if a dedicated PATI instruction is not provided, the control program logic is provided to emulate the cache control logic discussed above, in order to support the PATI request.

Moreover, in some examples, the computer program discussed above can be stored in a computer-readable storage medium, which could be a transitory storage medium or a non-transitory storage medium.

Particular examples will now be described with reference to the figures.

FIG. 1 schematically illustrates an example of a data processing system 102 having at least one processing element (PE) 104, which could (for example) be a CPU (central processing unit) or a GPU (graphics processing unit) which has an instruction decoder 106 for decoding program instructions and processing circuitry 108 which is controlled to perform processing operations in response to the instructions decoded by the instruction decoder 106. The PE 104 has a cache 110 for caching data from memory for faster access by the PE and has a memory management unit (MMU) 112 which functions as address translation circuitry for translating input addresses (e.g. virtual addresses specified by instructions executed by the PE 104) into output addresses (e.g. physical addresses identifying locations within the memory system). The MMU may have at least one address translation cache 114 for storing address translation data (which could include one or both of partial address translation data and full address translation data) which depends on page table data from page table structures stored in the memory system. The page table structures define the address mappings between input and output addresses and may also define memory access permissions which may define whether certain software processes executing on the PE 104 are allowed to access certain addresses. The MMU 112 may support 2-stage address translation where the mapping of a virtual address to a physical address depends on both stage 1 address translation data which maps the virtual address (VA) to an intermediate physical address (IPA) and stage 2 translation data which maps the IPA to a physical address (PA). The stage 1 address translation data may be set by an operating system or virtual machine. The stage 2 translation data may be set by a hypervisor. This is discussed in more detail below.

The PE 104 is an example of a requestor device which is capable of executing program instructions. While FIG. 1 only shows one such requestor device, it will be appreciated that system 102 could have two or more such devices, which may include further PEs, such as CPUs, CPUs or other types of instruction execution devices.

In addition to the PE 104 or other devices capable of instruction execution which have their own internal MMU 112, the system may also include requestor devices 120 (e.g. these devices could be I/O devices, hardware accelerators, etc.—for example, they could include devices which do not execute their own instructions, but can be configured by the PE to perform functions on behalf of the PE) which may not have an internal MMU, and so for accessing memory and providing address translation functionality, such devices may communicate with the rest of the system via a system memory management unit (SMMU) 122 which includes address translation circuitry which controls address translation and memory permissions based on translation data defined in page table structures in memory. Again, the SMMU 122 may have one or more address translation caches 124 which have a similar functionality to the address translation cache(s) 114 within the MMU 112 of the PE 104. The devices 120 which access memory via the SMMU 122 can include cached devices which include an internal cache 126 and uncached devices which do not have any cache. For example, a device 120 could include a display controller for controlling display of image frames on display, a network controller for controlling input or output of data via a network, a hardware accelerator for performing certain dedicated processing functions in a more efficient manner than can be achieved using software executing on a generic processor such as the PE 104, and so on. Similarly to the address translation cache(s) 114 in the MMU 112, the SMMU address translation cache(s) 124 may cache one or both of partial address translation data and full address translation data. It should be noted that, while the PATI request discussed herein is a request for invalidation of partial address translation data, the requester issuing the PATI request will not know the form of address translation cache present at any recipient of the request—it simply issues the request. Recipients who only have address translation caches caching full address translations can (for example) simply ignore the request altogether, while recipients who have an address translation cache caching partial address translations act on the request.

All of the requestor devices 104, 120 communicate with each other via an interconnect 130 which is responsible for routing transactions between the requestor devices and memory 132. Interconnect 130 may also be responsible for managing coherency between data cached in respective caches 110, 126 of the system. It will be appreciated that FIG. 1 is a simplified diagram and the system 102 may have many other components not shown in FIG. 1 for conciseness.

Figure 2:
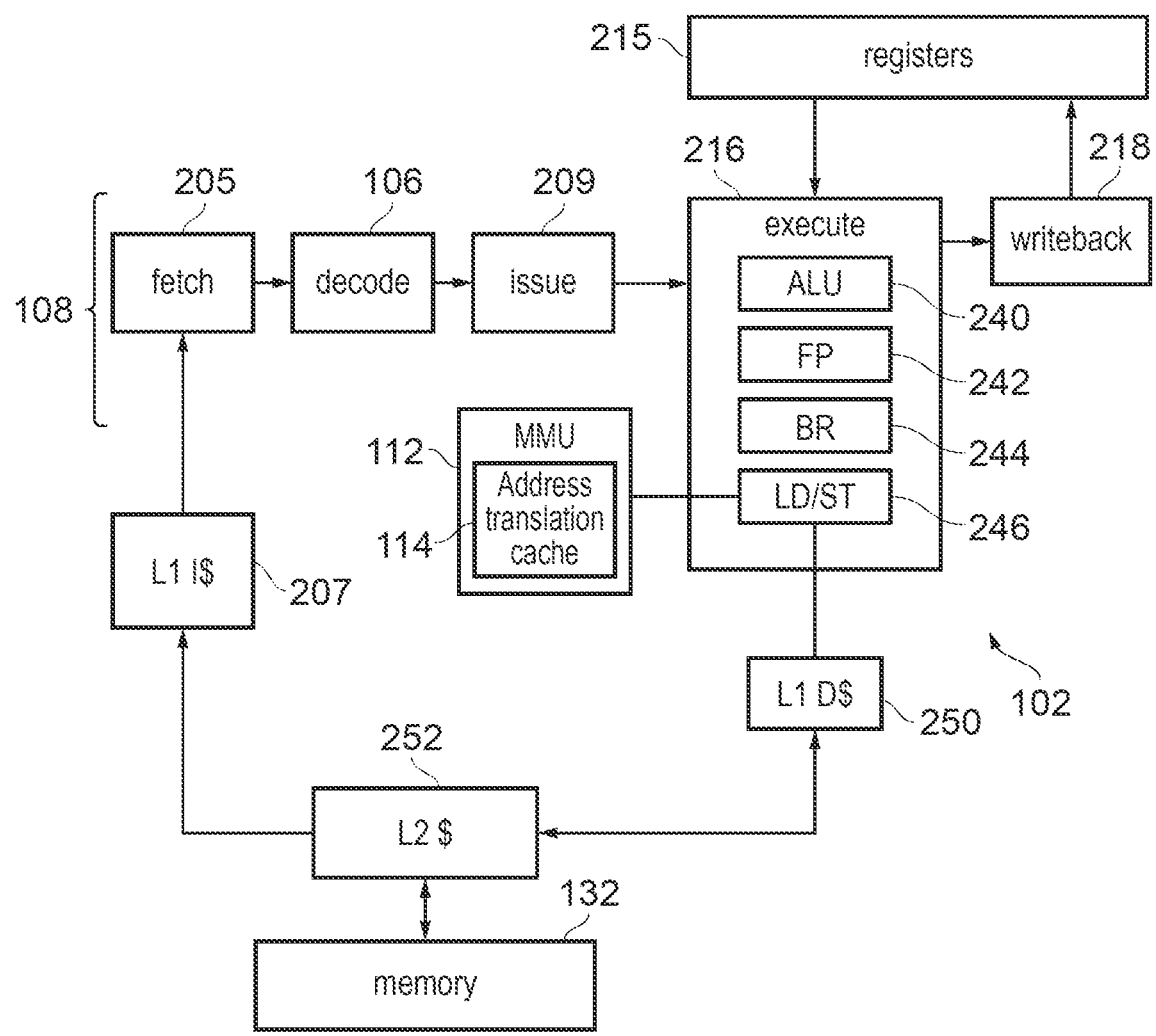

FIG. 2 schematically illustrates some of the components within a data processing apparatus 102 such as the data processing apparatus shown in FIG. 1. The data processing apparatus has a processing pipeline 108 (an example of processing circuitry, which could for example form part of a PE such as a CPU or a GPU)—note that, in this case, the instruction decoder 106 is considered to be part of the processing circuitry 108; whether or not the instruction decoder 106 is considered to be part of the processing circuitry is semantics. The processing circuitry 108 is for executing instructions defined in an instruction set architecture (ISA) to carry out data processing operations represented by the instructions. The processing pipeline 108 includes a number of pipeline stages. In this example, the pipeline stages include a fetch stage 205 for fetching instructions from an instruction cache 207; a decode stage (instruction decoder) 106 for decoding the fetched program instructions to generate micro-operations (decoded instructions) to be processed by remaining stages of the pipeline; an issue stage 209 for checking whether operands required for the micro-operations are available in a register file 215 and issuing micro-operations for execution once the required operands for a given micro-operation are available; an execute stage 216 for executing data processing operations corresponding to the micro-operations, by processing operands read from the register file 215 to generate result values; and a writeback stage 218 for writing the results of the processing back to the register file 215. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 215. In some examples, there may be a one-to-one relationship between program instructions defined in the ISA that are decoded by the decode stage 106 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 216 includes a number of processing units, for executing different classes of processing operation. For example the execution units may include a scalar arithmetic/logic unit (ALU) 240 for performing arithmetic or logical operations on scalar operands read from the registers 215; a floating point unit 242 for performing operations on floating-point values; a branch unit 244 for evaluating the outcome of branch operations and adjusting the program counter which represents the current point of execution accordingly; and a load/store unit 246 for performing load/store operations to access data in a memory system 207, 250, 252, 132.

As in FIG. 1, the memory management unit (MMU) 112 controls memory access permission checks and performing address translations between virtual addresses specified by the load/store unit 246 based on operands of data access instructions and physical addresses identifying storage locations of data in the memory system. While the MMU 112 is shown as associated with the load/store unit 246, the MMU 112 may also be looked up on instruction fetches triggered by the fetch stage 205 (or a separate instruction-side MMU may be implemented to handle instruction fetches, separate from the data-side MMU used by the load/store unit 246 for data accesses—in this case both MMUs can cache in their address translation caches 114 information from a shared set of page tables).

In this example, the memory system includes a level one data cache 250, the level one instruction cache 207, a shared level two cache 252 and main system memory 132. The caches 207, 250, 252 are examples of the cache(s) 110 shown in FIG. 1. It will be appreciated that this is just one example of a possible memory hierarchy and other arrangements of caches can be provided. The specific types of processing unit 240 to 246 shown in the execute stage 216 are just one example, and other implementations may have a different set of processing units or could include multiple instances of the same type of processing unit so that multiple micro-operations of the same type can be handled in parallel. It will be appreciated that FIG. 2, like FIG. 1, is merely a simplified representation of some components of a possible processor pipeline implementation, and the processor may include many other elements not illustrated for conciseness.

Figure 3:
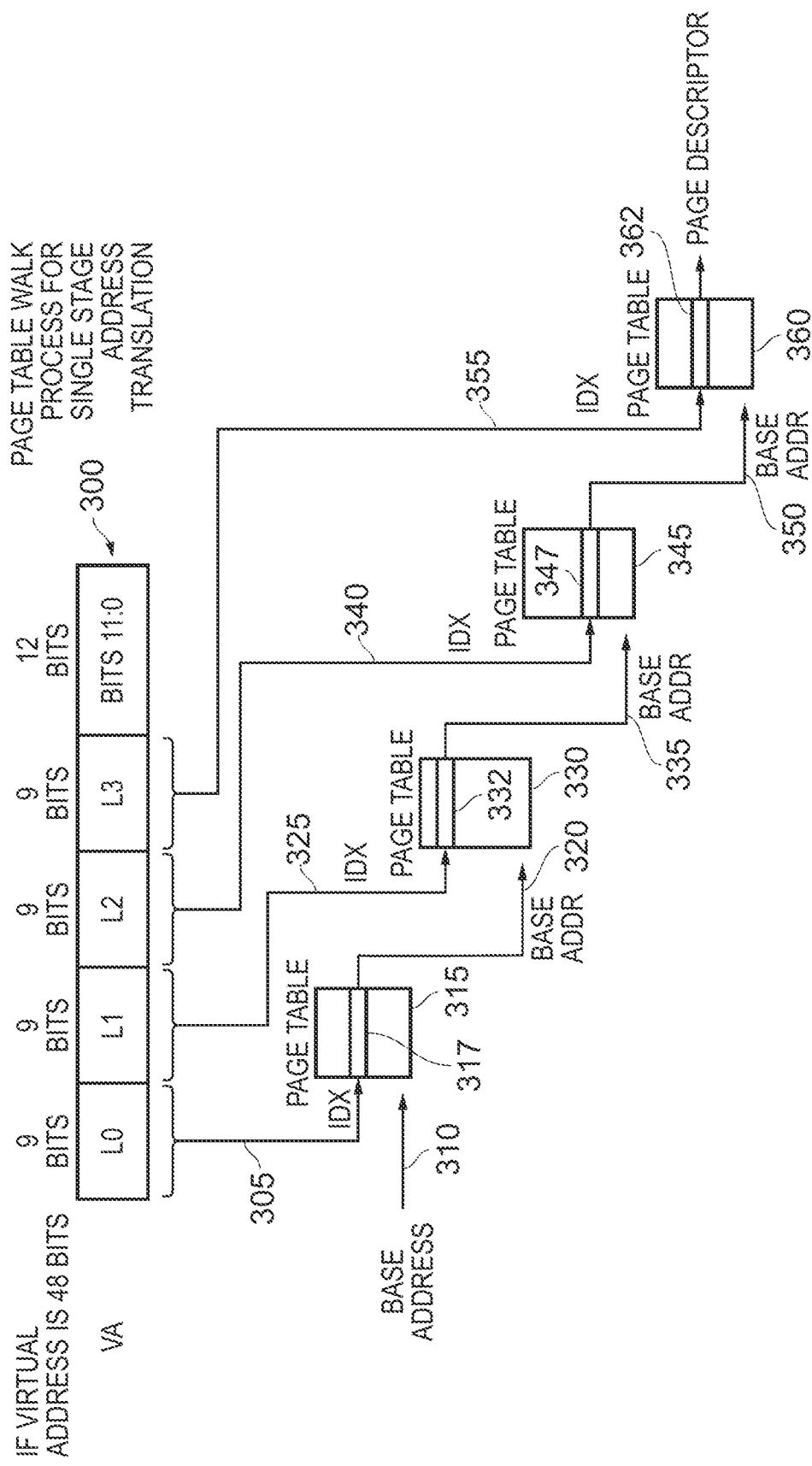
FIG. 3 shows how a multi-level table structure may be used to translate an input address to an output address.

FIG. 3 is a diagram schematically illustrating a page table walk operation performed by page table walk circuitry to identify an output address corresponding to an input address to be translated, assuming there is a single stage address translation mechanism being used. In this example, it is assumed that the virtual address is 48 bits, and that the virtual address 300 has a series of 9 bit portions associated with different levels of the page table walk process, with the 12 least significant bits denoting page offset.

At the start of the page table walk process, a base register is accessed to identify a base address 310 that is used to identify the page table 315. The 9 bits 305 associated with level zero of the page table walk process are used to identify an index into that page table 315, and hence identify a branch page table entry storing an intermediate level descriptor 317. This intermediate level descriptor 317 provides a base address 320 (also referred to as a table address) that is used to identify a further page table 330, with the level one virtual address bits 325 being used to identify an index into that table. This identifies the intermediate level descriptor 332 that provides a further base address (table address) 335 to identify the page table 345. The level 2 virtual address bits 340 are then used to provide an index into that table 345 in order to identify the intermediate level descriptor 347, which then provides the base address (table address) 350 that identifies a final page table 360. The level 3 virtual address bits 355 then provide an index into that table 360, identifying a leaf page table entry specifying a final level descriptor 362 (also referred to as a page descriptor or leaf descriptor). With the information provided by the page descriptor, it is then possible to generate full address translation data for storing in one of the entries of the address translation cache 114 enabling the virtual page number 355 to be converted into a physical page number 370 and hence allowing the required page in memory to be identified. This then enables the particular item of data (or instruction) corresponding to the virtual address to be accessed by the core issuing the required physical address to the memory system. An example of an address translation cache 114, 124 which stores full address translation data like this is a translation lookaside buffer (TLB).

In addition, partial address translation data corresponding to the one or more of the base addresses 320, 335, 350 could also be stored in the address translation cache 114, 124. An example of address translation cache 114, 124 which stores partial address translation data is a page walker cache. Moreover, it is also possible for an address translation cache 114, 124 to be provided which stores both full and partial address translation data.

It should be noted that in some embodiments final level descriptors (output addresses) can be specified at an earlier level in the page table walk process. For example, the descriptor 347 can have a block field which, when set, indicates that that descriptor is a block descriptor, which is a type of final level descriptor (e.g. an output address for an address translation mapping for a corresponding block of memory), rather than being an intermediate level descriptor (e.g. indicative of a table address). Hence, the information within the descriptor 347 can be used to produce the full address translation data, and the entry of the page table 345 storing the block descriptor would, in such examples, be a leaf page table entry.

It will hence be appreciated that full address translation information returned to the address translation circuitry to enable address translation data to be allocated into the address translation cache can relate to various different page sizes. For example, if the final level descriptor is the descriptor 362, i.e. is a leaf descriptor, then the received translation information may relate for example to a 4 KB sized page. Conversely, if the final level descriptor is a block descriptor then the associated page size is likely to be significantly larger. For example, if the descriptor 347 in FIG. 3 is such a block descriptor, then it may in one embodiment relate to a 2 MB page size. Moreover, as will be discussed in more detail below, it is also possible to cache partial address translation data in an address translation cache, indicative of one of the base addresses 320, 335, 350.

Figure 4:
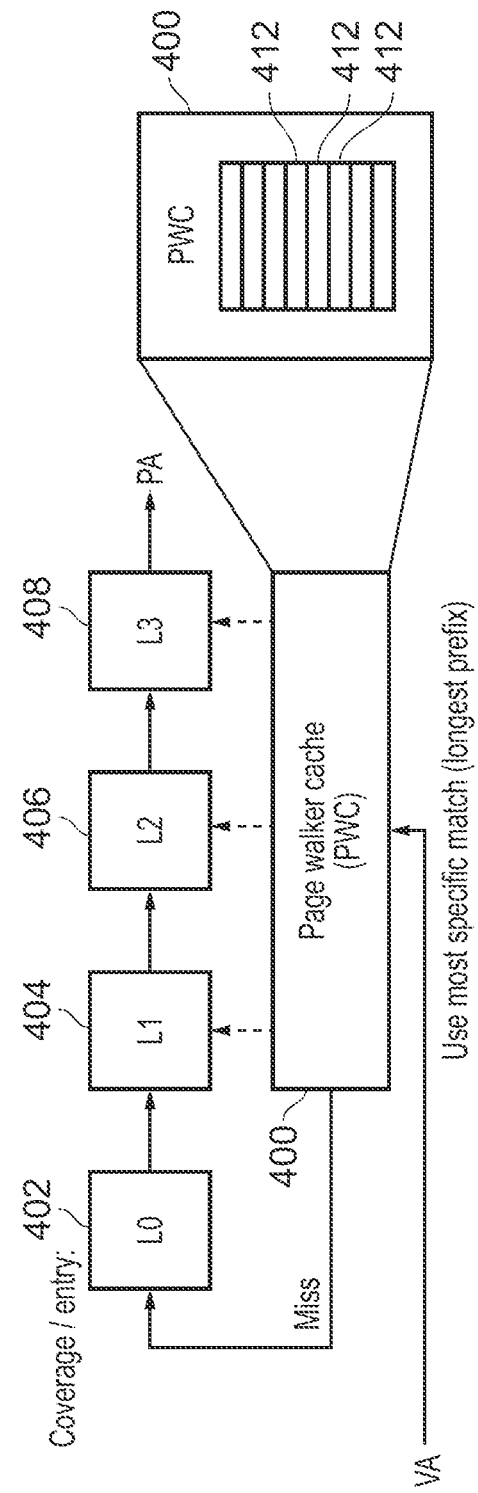
FIG. 4 illustrates use of a page walker cache (PWC) in performing address translation.

For example, FIG. 4 schematically illustrates the use of a page walker cache 400 (which is an example of an address translation cache 114, 124 and which comprises a plurality of cache entries 412) in address translation circuitry when translating from a virtual address (VA) as an input address to a physical address (PA) as an output address. The address translation circuitry receives the virtual address and performs an initial lookup in the page walker cache 400. The lookup in the page walker cache 400 determines if the virtual address, or a portion thereof, has already been recently translated by the address translation circuitry. The lookup in the page walker cache 400 will result in a hit if any sequential most significant portions of the input address hit in the cache. Therefore, there will be a cache hit if the most significant N-bit portion of the virtual address (e.g. the L0 index portion 305 in FIG. 3) hits in the page walker cache 400. There will also be a hit if the two most significant N-bit portions of the virtual address (e.g. the L0 and L1 index portions 305, 325) hit in the page walker cache 400. There will also be a hit if the three most significant N-bit portions of the virtual address (e.g. the L0, L1 and L2 index portions 305, 325, 340) hit in the page walker cache. If the page walker cache 400 is a shared structure that also caches full translations, then there will also be a hit if the four most significant N-bit portions of the virtual address (e.g. the L0, L1, L2 and L3 index portions 305, 325, 340, 355) hit in the page walker cache. On the other hand, other implementations may cache full translations in a separate structure from the partial translations, and in this case the page walker cache 400 may not detect any hit based on the combination of the L0, L1, L2 and L3 index portions 305, 325, 340, 355.

In this way the page walker cache can determine multiple hits for a single virtual address. Where there are multiple hits in the page walker cache 400, the address translation circuitry is configured to use the most specific match, i.e., the hit that matches the most N-bit portions of the virtual address. Unless the match is across the full set of index portions 305, 325, 340, 355 (in which case the result of the lookup is full address translation data), the result of this lookup—regardless of how many of the most significant N-bit portions are matched—is partial address translation data, since it can allow an address translation to be performed with reduced latency, despite not identifying the output PA.

If the lookup in the page walker cache 400 misses, then the address translation circuitry performs the address translation by performing the maximum predetermined number of sequential lookups in page table levels, e.g. by instructing page walk circuitry to perform a page walk as shown in FIG.

3. In this case the page walk circuitry performs the L0 level lookup 402, the L1 level lookup 404, the L2 level lookup 406 and the L3 level lookup 408 in order to determine the physical address.

If the best hit in the page walker cache 400 matches only the most significant N-bit portion of the virtual address, then the address translation circuitry does not need to perform the L0 lookup as the result of this lookup can be retrieved from the page walker cache. Hence, the address translation circuitry performs the L1 lookup 404, the L2 lookup 406 and the L3 lookup 408 in order to determine the physical address.

If the best hit in the page walker cache 400 matches the two most significant N-bit portions of the virtual address, then the address translation circuitry does not need to perform the L0 lookup or the L1 lookup as the result of these lookups can be retrieved from the page walker cache. Hence, the address translation circuitry performs the L2 lookup 406 and the L3 lookup 408 in order to determine the physical address.

If the best hit in the page walker cache 400 matches the three most significant N-bit portions of the virtual address, then the address translation circuitry does not need to perform the L0 lookup, the L1 lookup or the L2 lookup as the result of these lookups can be retrieved from the page walker cache. Hence, the address translation circuitry performs only the L3 lookup 408 in order to determine the physical address.

Figure 5:
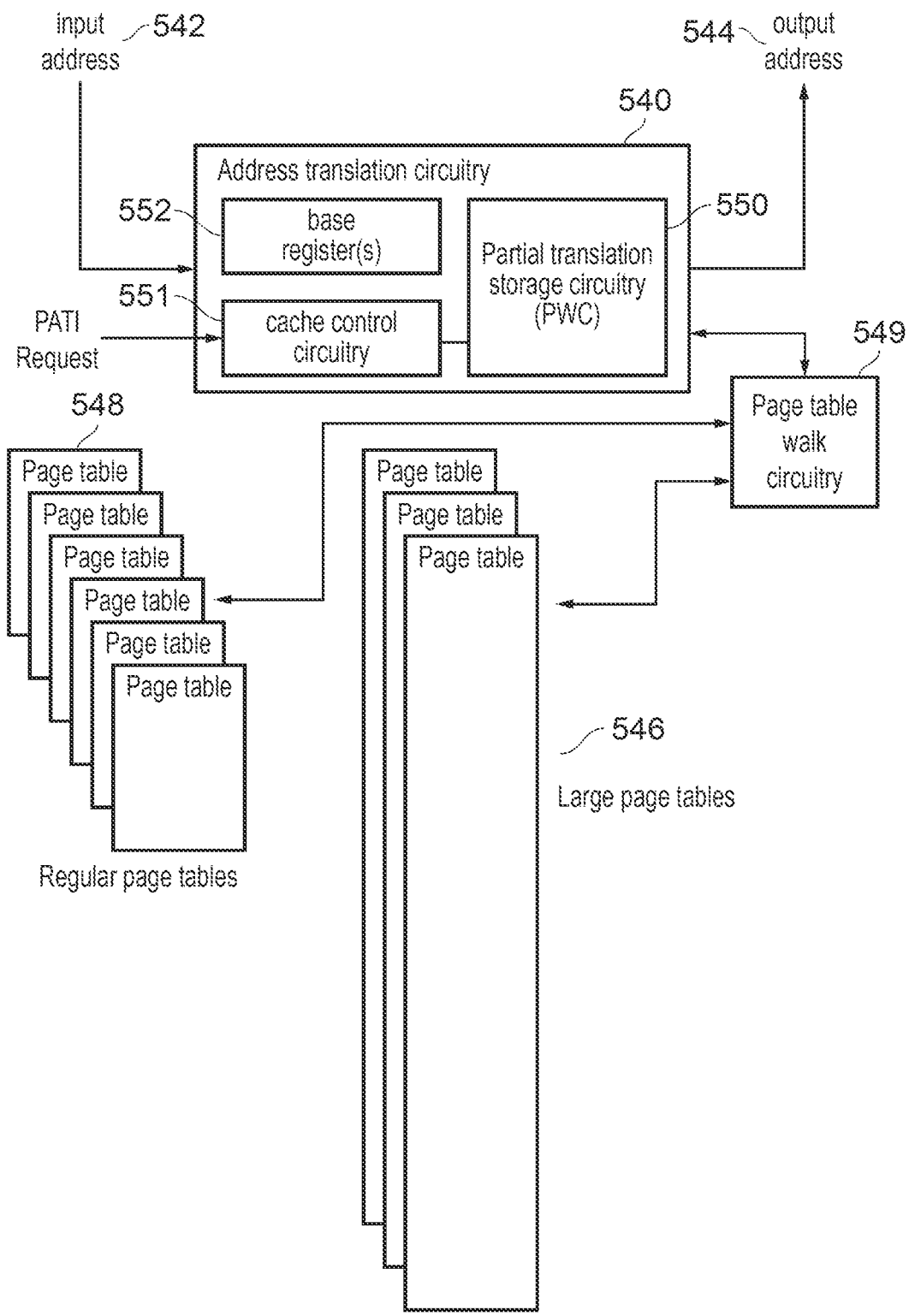
FIGS. 5-7 show how multiple page table levels can be merged together.

FIG. 5 demonstrates a particular use case for the PATI request of the present technique. In particular, FIG. 5 schematically illustrates details of address translation circuitry 540 in some example configurations. The address translation circuitry comprises partial translation storage circuitry 550 (e.g. this could be a page walker cache (PWC) 400, or an generic address translation cache 114 which stores both full and partial address translation data) to cache information related to previous address translations. The address translation circuitry 540 is also provided with at least one base register 552 (e.g. in some embodiments there may be separate privileged and unprivileged base registers). The base register 552 comprises an address of a sequentially first (e.g. L0) page table level and, optionally, size information indicative of a size of the sequentially first page table level (e.g. dependent on whether merging of the L0 page table is supported—if only the L1/L2 page tables can be merged, there may be no need for this size information to be provided).

The address translation circuitry 540 receives an input address 542 and performs a translation to output an output address 544. The address translation circuitry 540 performs the translation by passing either the input address and the base address or partial address translation data stored in the address translation cache 550 to page table walk circuitry 549, which performs a page table walk comprising a number of sequential lookups in a number of page tables. The page tables comprise regular page table levels 548 and large (e.g. merged) page table levels 546. Each lookup uses information from a preceding lookup (or, in the case of the L0 lookup, a base address stored in a base address register) and information from the input address. The lookups comprise intermediate lookups that produce an address of sequentially next lookup in a sequentially next page table level and page table level size information indicative of a size of the sequentially next page table level.

The address translation circuitry also includes cache control circuitry 551 to control the address translation cache 550. The cache control circuitry is configured to perform a partial address translation invalidation (PATI) process in response to a PATI request (e.g. a command written to a command queue and detected by the cache control circuitry, or a command issued on the memory system interconnect 130). The PATI process involves identifying target cache entries in the address translation cache (e.g. based on a target address and/or a context ID specified by the PATI request), and invalidating the target cache entries if they store partial address translation data but not full address translation data. For example, a PATI request could be issued when multiple regular page tables 548 are merged to form a large/merged page table 546. In this situation, any partial address translation data corresponding to the merged page tables may no longer be correct, even if the address translation itself is still correct. Hence, it can be useful in such a situation to be able to invalidate partial address translation data without invalidating full address translation data.

Figure 6:
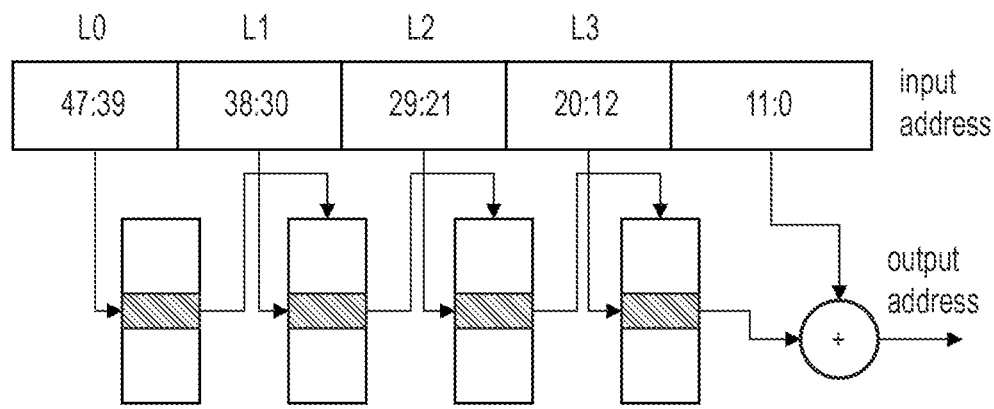

FIG. 6 schematically illustrates details of an address translation that is carried out by the address translation circuitry 540 according to various configurations. The address translation circuitry 540 receives an input address. The input address comprises 48 bits which includes a sequence of indexing portions (bits 47 down to 39; bits 38 down to 30; bits 29 down to 21; and bits 20 down to 12). Each indexing portion of the sequence of indexing portions corresponds to (is used for) a corresponding lookup level. In the illustrated configuration, four lookups are shown and the first address comprises one indexing portion for each of the lookups.

Bits 47 down to 39 of the input address are the L0 indexing bits that are used to index into the page table level accessed during the L0 lookup (the sequentially first intermediate lookup). The L0 lookup is performed in a page table level at a page table address (L0 base address) stored in storage circuitry (e.g. a base address register) of the address translation circuitry. The storage circuitry further comprises size information indicating that the L0 lookup is a lookup in a regular page table level. The lookup performed based on the L0 base address and the L0 indexing bits returns a base address to be used for the sequentially next look, the L1 lookup, and size information indicating that the L1 lookup is a lookup in a regular page table level.

Bits 38 down to 30 of the input address are the L1 indexing bits that are used to index into the page table level accessed during the L1 lookup (the sequentially second intermediate lookup of the predetermined number of lookups). The L1 lookup is performed in a page table level at the base address obtained during the L0 lookup (L1 base address). The lookup performed based on the L1 base address and the L1 indexing bits returns a base address to be used for the sequentially next lookup, the L2 lookup, and size information indicating that the L2 lookup is a lookup in a regular page table level.

Bits 29 down to 21 of the input address are the L2 indexing bits that are used to index into the page table level accessed during the L2 lookup (the sequentially third intermediate lookup of the predetermined number of lookups). The L2 lookup is performed in a page table level at the base address obtained during the L1 lookup (L2 base address). The lookup performed based on the L2 base address and the L2 indexing bits returns a base address to be used for the sequentially next lookup, the L3 lookup, and size information indicating that the L3 lookup is a lookup in a regular page table level.

Bits 20 down to 12 of the input address are the L3 indexing bits that are used to index into the page table level accessed during the L3 lookup (the final lookup of the predetermined number of lookups). The L3 lookup is performed in a page table level at the base address obtained during the L2 lookup (L3 base address). The lookup performed based on the L3 base address and the L3 indexing bits returns an address that is combined with the addressing portion (bits 11 down to 0) of the input address to obtain the output address.

Figure 7:
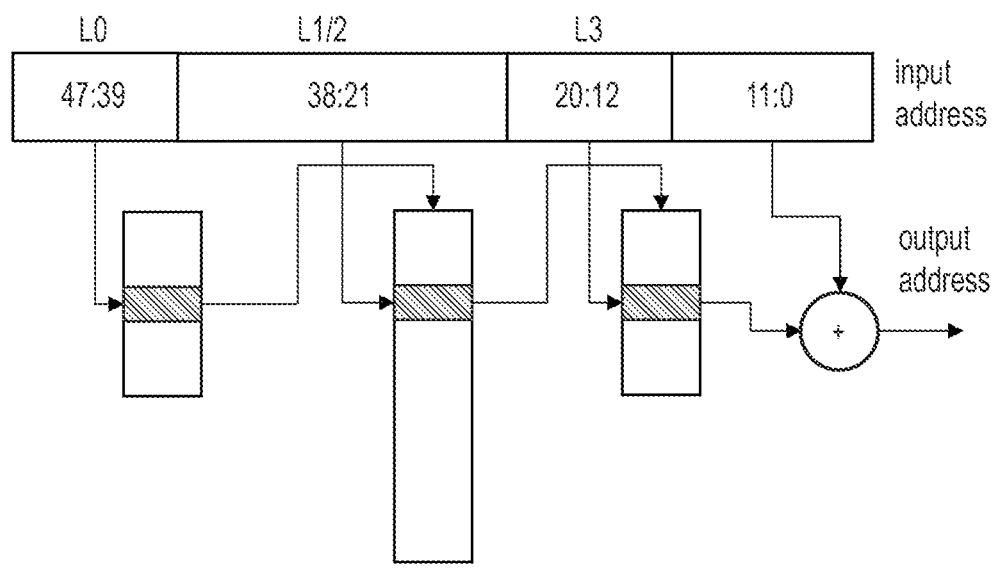

FIG. 7 schematically illustrates details of how the input address may be translated into an output address when the L1 and L2 tables have been merged. As in FIG. 6, the address translation circuitry 540 receives the input address. The input address is a 48-bit input address which comprises a sequence of indexing portions (bits 47 down to 39; bits 38 down to 21; and bits 20 down to 12). Each indexing portion of the sequence of indexing portions corresponds to (is used for) a corresponding lookup level. However, the input address in this example is treated as comprising only three indexing portions. The second indexing portion (bits 38 down to 21) corresponds to a large lookup (of a large/merged page table) that is indexed using two sequential indexing portions (i.e., the combination of bits 38 down to 30 and bits 29 down to 21—more generally, if a regular (unmerged) page table indexed using N bits comprises $2^N$ entries, and a large (merged) page table comprises $2^n$ entries, the index for a large lookup comprises M sequential N-bit index portions of the input address). In order that the indexing portions of the input address are correctly interpreted by the address translation circuitry, the corresponding page table levels store size information indicating when a next page table level is a large page table level. In the example of FIG. 7, size information is indicated in the L0 page table entry identified in the first lookup to indicate that the L1 and L2 tables have been merged.

As in the example shown in FIG. 6, bits 47 down to 39 of the input address are the L0 indexing bits that are used to index into the page table level accessed during the L0 lookup (the sequentially first intermediate lookup of the predetermined number of lookups). The L0 lookup is performed in a page table level at a table address (L0 base address) stored in storage circuitry (e.g. a base address register) of the address translation circuitry. The storage circuitry further comprises size information indicating that the L0 lookup is a lookup in a regular page table level. The lookup performed based on the L0 base address and the L0 indexing bits returns a base address to be used for the sequentially next lookup, a merged L1/L2 lookup, and size information indicating that the L1/L2 lookup is a lookup in a large page table level.

Unlike the example shown in FIG. 6, bits 38 down to 21 of the input address are the L1/L2 indexing bits that are used to index into the large page table level accessed during the L1/L2 lookup (the sequentially second lookup that is a single lookup in a large page table and that is equivalent to the L1 lookup and the L2 lookup of FIG. 6). The L1/L2 lookup is performed in a large (merged) page table level at the base address obtained during the L0 lookup (L1/L2 base address). The lookup performed based on the L1/L2 base address and the L1/L2 indexing bits returns a base address to be used for the sequentially next lookup, the L3 lookup, and size information indicating that the L3 lookup is a lookup in a regular page table level.

Bits 20 down to 12 of the input address are, as in the example of FIG. 6, the L3 indexing bits that are used to index into the page table level accessed during the L3 lookup (the final lookup of the predetermined number of lookups). The L3 lookup is performed in a page table level at the base address obtained during the L1/L2 lookup (the L3 base address). The lookup performed based on the L3 base address and the L3 indexing bits returns an address that is combined with the addressing portion (bits 11 down to 0) of the first address to obtain the second address.

In the illustrated configuration the L1 and L2 lookups were combined to form a single lookup in a large page table. It would be readily apparent to the skilled person that any sequential page table level lookups could be combined based on the techniques disclosed herein. Furthermore, the illustrated configurations show that 9 bits are used for each of N-bit portion. However, in alternative configurations a different number of bits can be provided and different lookup levels can be provided that each use a different number of bits.

As mentioned above, the present technique can also be implemented in systems which employ two-stage address translations. For example, two-stage address translation may be implemented for memory accesses performed when the processing circuitry is in a certain subset of execution states. Hence, the virtual addresses from those execution states are translated using two sets of tables. These tables support virtualization and allow a hypervisor to virtualize the view of physical memory that is seen by a given virtual machine (VM) (the virtual machine corresponding to a guest operating system and the applications controlled by that guest operating system). We call the set of translations that are controlled by the OS, stage 1 (S1). The stage 1 tables translate virtual addresses to intermediate physical addresses (IPAs—an example of the intermediate addresses mentioned earlier). In stage 1, the OS behaves as if the IPAs are physical address spaces. However, the hypervisor controls a second set of translations, which is called stage 2 (S2). This second set of translations translates IPAs to physical addresses.

The stage-1 and stage-2 translation tables are implemented as hierarchical table structures comprising a number of levels of translation tables as shown in FIGS. 3 to 7 for a single stage of translation (e.g. one of stage-1 and stage-2). In this example, both the stage-1 and stage-2 tables could have 4 levels of page tables, namely level 0 (L0), level 1 (L1), level 2 (L2) and level 3 (L3). While FIG. 8 does not show any table merging for either stage 1 or stage 2, it could be supported as shown in the example of FIG. 7.

Figure 8:
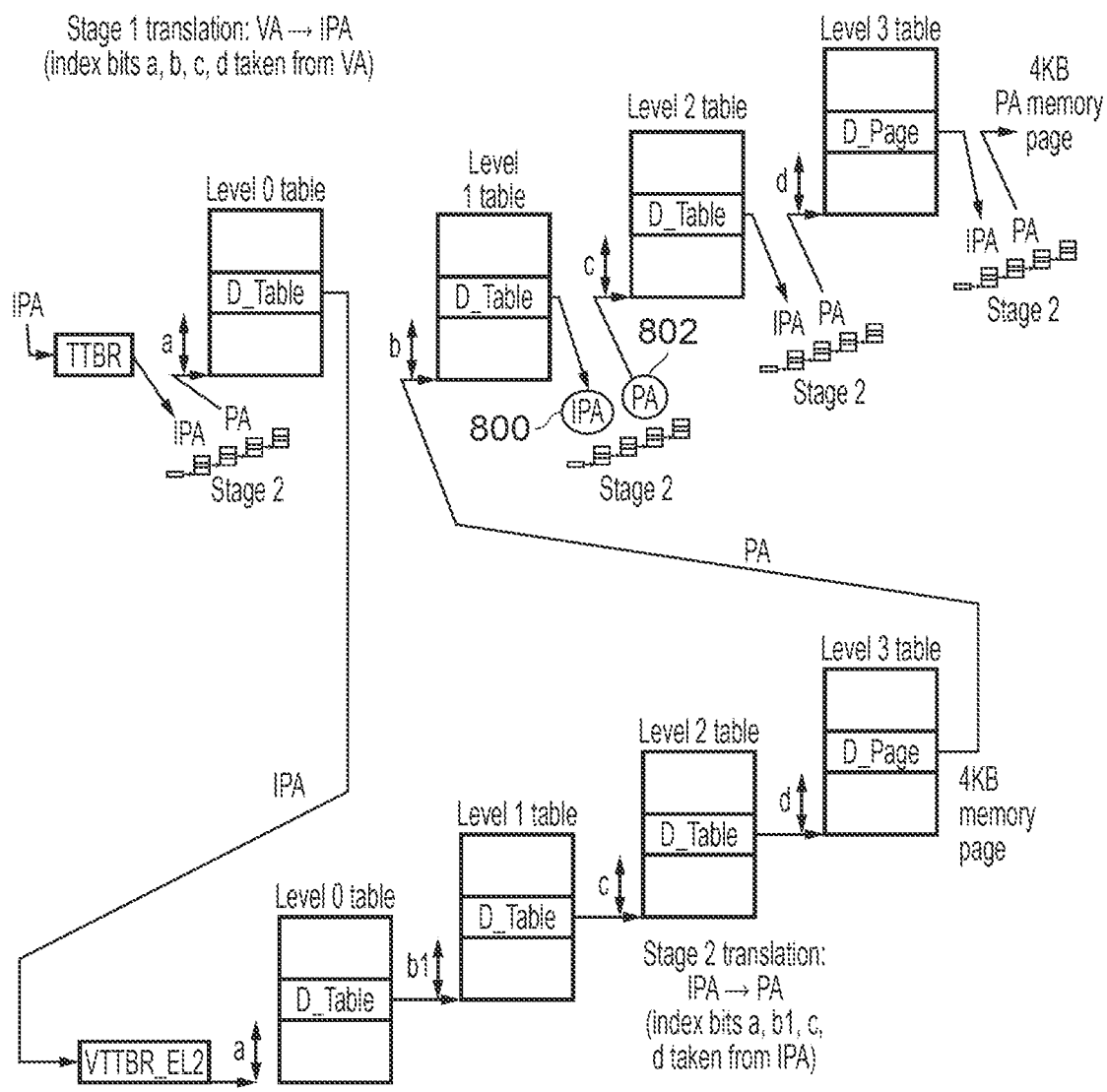
FIG. 8 illustrates two-stage address translation using stage-1 (S1) and stage-2 (S2) page tables.

As shown in FIG. 8, in practice when the full translation table walk including both stage-1 and stage-2 translation is performed, then each stage-1 table base address obtained from the TTBR (translation table base register) and the table descriptors accessed in the stage-1 L0, L1, L2 translation tables will be an intermediate address which itself needs translating using the stage-2 translation tables. Hence, in cases when the translation table walk does not encounter any Block descriptors, but proceeds all the way to L3 where a Page descriptor is found, then, in the absence of any table merging being applied, the full page table walk process may include accessing the multiple levels of page tables in the following sequence:

Stage-2 translation of the base address of the stage-1 L0 page table into a physical address (the stage-1 L0 base address is typically an intermediate physical address because the stage 1 translations are configured by the operating system). The stage-2 translation comprises 4 lookups (stage-2 L0; stage-2 L1; stage-2 L2; stage-2 L3).

Stage 1 L0 lookup of an entry at the address obtained based on the L0 index portion "a" of the target virtual address and the translated stage-1 L0 base address, to obtain the stage-1 L1 base address (an intermediate physical address)

Stage-2 translation of the stage-1 L1 base address into a physical address (again, comprising 4 lookups).

Stage 1 L1 lookup of an entry at the address obtained based on the L1 index portion "b" of the target virtual address and the translated stage-1 L1 base address, to obtain the stage-1 L2 base address (an intermediate physical address)

Stage-2 translation of the stage-1 L2 base address into a physical address (again comprising 4 lookups) Stage 1 L2 lookup of an entry at the address obtained based on the L2 index portion "c" of the target virtual address and the translated stage-1 L2 base address, to obtain the stage-1 L3 base address (an intermediate physical address)

Stage-2 translation of the stage 1 L3 base address into a physical address (again comprising 4 lookups).

Stage 1 L3 lookup of an entry at the address obtained based on the L3 index portion "d" of the target virtual address and the translated stage-1 L3 base address, to identify the target intermediate physical address corresponding to the target virtual address.

Stage-2 translation of the target intermediate physical address into the target physical address which represents the location in memory to access corresponding to the original target virtual address (again, comprising 4 lookups).

Hence, without any caching, and assuming the starting level for stage 2 is L0, the translation would comprise 24 lookups in total. If the starting level for stage 2 is L1, this can reduce the number of lookups to 19 (one less lookup for each of the 5 stage-2 translations performed). Nevertheless, as can be seen from the above sequence, performing the entire page table walk process can be very slow as it may require a large number of accesses to memory to step through each of the levels of page tables for each of the stages of address translation. This is why it is often desirable to cache information derived from translation table walks in the address translation cache 114. The cached information can include full address translation data, which could be a final stage-1 address mapping from VA to IPA, a final stage-2 mapping from IPA to PA, or a combined stage-1 and stage-2 mapping from VA direct to PA (derived from previous lookups of the stage 1 and stage 2 structures). Alternatively (or in addition, if the address translation cache 114 stores both partial and full address translation data), the cached information can include partial address translation data, which could be based on entries from higher level page tables of the stage 1 and the stage 2 tables. This can allow at least some steps of the full page table walk to be bypassed even if the final level address mapping for a given target address is not currently in the address translation cache.

In the same way that the full address translation data can be indicative of a translation from a VA to an IPA, an IPA to a PA, or a VA to a PA, the partial address translation data could also be indicative of mappings from either a VA or an IPA to an IPA or a PA. For example, the address translation cache could store partial address translation data mapping an input VA to a corresponding L2 base address, which could be expressed as either the IPA 800 returned by the S1 L1 table or the PA 802 returned by the S2 L3 table following a lookup for the IPA returned by the S1 L1 table. Alternatively, partial address translation data stored in the address translation cache could map an IPA to a PA, e.g. indicating for a given IPA the PA of the S2 L2 table corresponding to that IPA.

An address translation cache may cache both stage-1 and stage-2 address translation data (e.g. for use in translating VAs into PAs without expressing the intervening IPA), or separate address translation caches may be provided for stage 1 and stage 2 translations. Hence, the output address identified by full address translation data could be a physical address obtained from a stage-2 translation table, or an intermediate address obtained from a stage-1 address translation table. Similarly, each cache entry may be associated with all or part of an input address, which could be a virtual address or an intermediate physical address.

Figure 9:
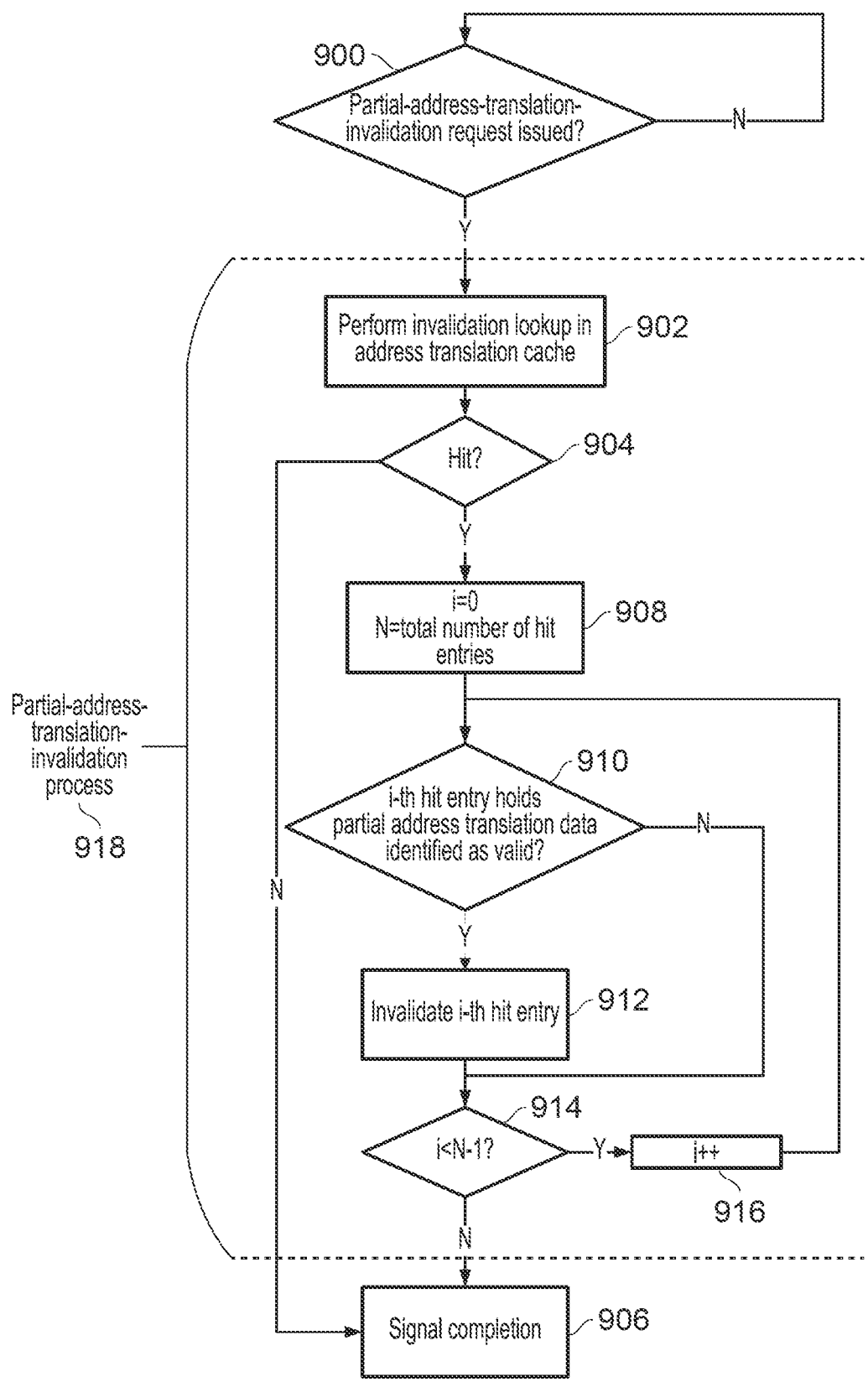
FIG. 9 is a flow diagram showing how cache control circuitry may respond to a partial-address-translation-invalidation request.

FIG. 9 is a flow diagram illustrating an example of a method performed by cache control circuitry 551 in response to a PATI request.

The method includes a step 900 of determining whether a PATI request has been issued. When it is determined that the PATI request has been issued, the cache control circuitry performs 902 an invalidation lookup in the address translation cache to identify target cache entries. For example, the invalidation lookup could be based on a comparison of indices/tags associated with the cache entries with information specified by the PATI request (such as a target address), or could be based on walking the entire cache to check each entry to determine whether it is a hit. The walk approach may be useful for cases where the PATI request is invalidating by output address, table level or other parameter other than input address (although it will be appreciated that it is also possible to use this the walk approach when the PATI request specifies target input address information). For example, the invalidation lookup may determine whether a hit is detected for a particular entry dependent on information specified by the PATI address. For example, the PATI address could specify one or more of:

an input address or range of input addresses (e.g. this could be a virtual address (VA) or range of VAs in virtual address space or an intermediate physical address (IPA) or range of IPAs in intermediate physical address space), in which case a hit would not be detected unless input address information associated with a given entry matches input address information specified by the PATI request;

an output address or range of output addresses in an output address space (e.g. this could be a physical address (PA) or range of PAs in physical address space or an intermediate physical address (IPA) or range of IPAs in intermediate physical address space), in which case a hit would not be detected unless output address information associated with a given entry matches output address information specified by the PATI request;

a further address or range of further addresses in a further address space translated from the output address space (e.g., when invalidating stage-1 partial translations which provide a table address for use in translating VA to IPA, the PATI request could invalidate by PA).

a table-level indicator identifying one or more levels of the multi-level page table structure, in which case a hit would not be detected unless the given entry holds partial address translation data corresponding to the identified one or more levels specified by table-level indicator in the PATI request; and a context identifier (e.g. based on one or more of a virtual machine identifier (VMID), an address space identifier (ASID) or a security state identifier), in which case a hit would not be detected unless a context identifier associated with a given entry in the cache matches a context identifier specified by the PATI request.

Moreover, in some examples the PATI request may be a global PATI request, which triggers invalidation of all partial address translation data in the address translation cache. In this case, a hit may be detected for any entry storing partial address translation data.

If 904 the lookup misses in the address translation cache (e.g. no hit is detected), the process ends and the control circuitry signals 906 completion (e.g. to processing circuitry). On the other hand, if 904 at least one hit is detected (e.g. if hits against N entries are detected), the following set of steps is performed for each hit entry (after initialising 908 an index "i" to 0):

- it is determined 910 if the i-th hit entry holds partial address translation data (e.g. as opposed to holding full address translation data) that is currently indicated as valid;
- if so, the i-th hit entry is invalidated 912, otherwise, step 912 is skipped for the i-th hit entry (e.g. it is not invalidated);
- it is determined 914 whether there is still at least one remaining entry to process (e.g. if i<N−1);
- if so, the process ends and completion is signalled 906; otherwise, the value of i is increased 916 by 1 (e.g. i++ can also be written as i+=1 or i=i+1), and the process repeats from step 910.

Steps 902 to 916 are collectively a PATI process 918.

Hence, by this approach, the cache control circuitry responds to a PATI request by invalidating partial address translation data in any hit entries, without invalidating full address translation data even if the full address translation data meets the filter conditions (e.g. specified based on input/output address and/or context identifier) specified by the PATI request.

Figure 10:
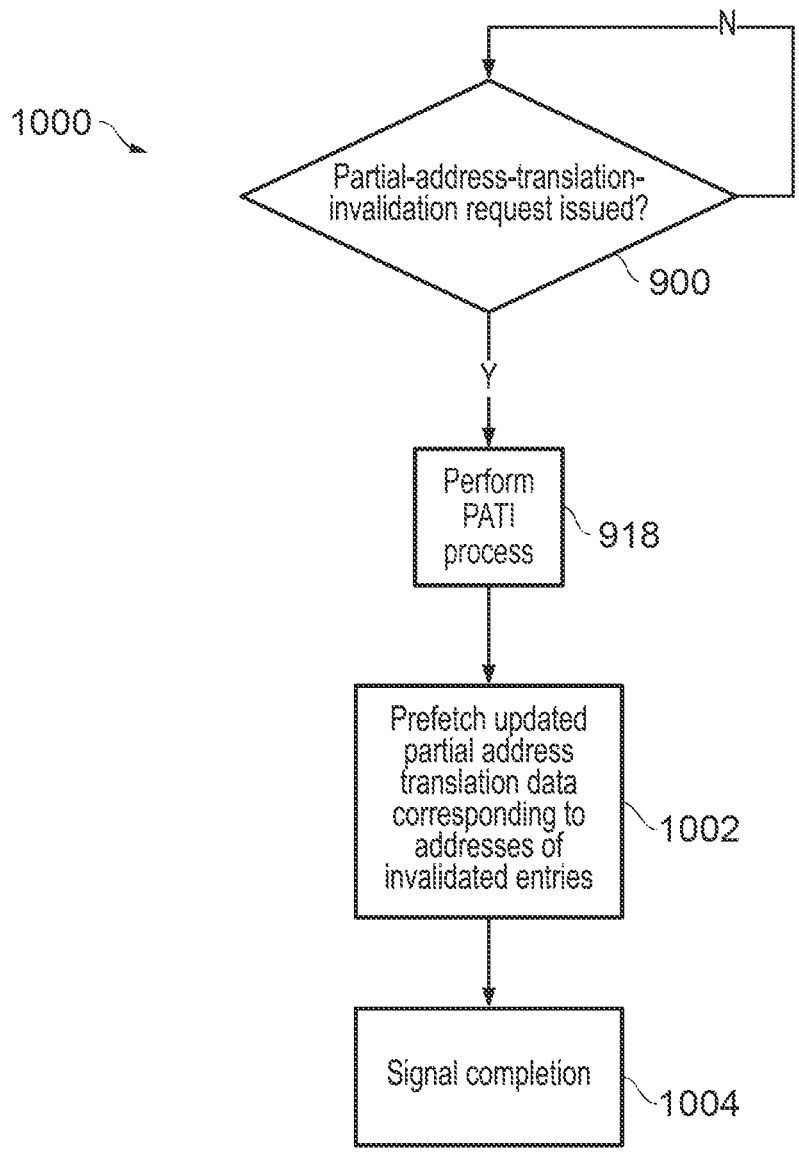
FIG. 10 is a flow diagram showing prefetching in response to a partial-address-translation-invalidation request.

FIG. 10 is a flow diagram illustrating a prefetch operation 1000 performed by the cache control circuitry in response to the PATI request. This process may be performed in parallel with the PATI process 918, or after performing the PATI process.

As in the PATI process, the cache control circuitry responds to a PATI request by performing the partial address translation invalidation (PATI) process 918, and prefetching 1002 updated partial address translation data if the entry has been invalidated during the PATI process. Once the prefetching operation has completed, the cache control circuitry signals 1004 completion.

Hence, up-to-date partial address translation data can be brought into the address translation cache, without evicting any valid entries of the cache which hold address translation data for other address translation mappings.

Figure 11:
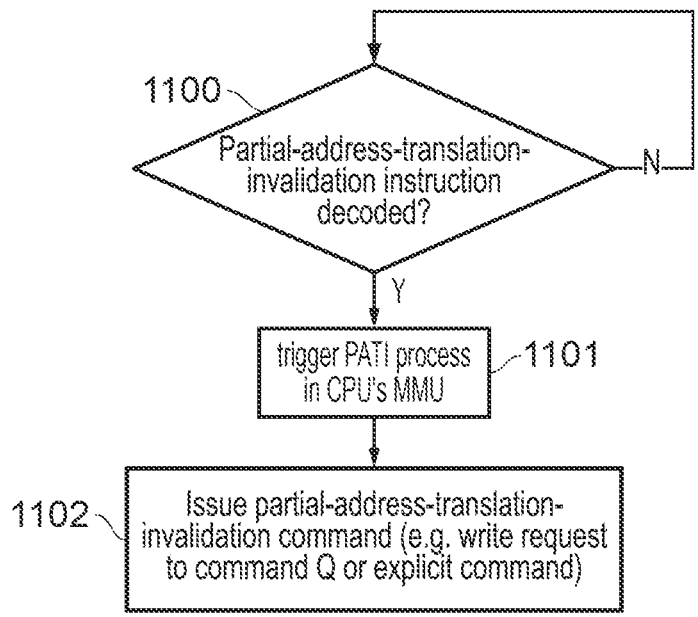
FIG. 11 is a flow diagram showing decoding and execution of a partial-address-translation-invalidation instruction by processing circuitry.

FIG. 11 shows an example of a method performed by processing circuitry in response to receiving a decoded PATI instruction. The method involves determining 1100 whether a PATI instruction has been decoded and, when it is determined that a PATI instruction has been decoded, triggering 1101 a partial address translation invalidation (PATI) process 918 to be performed in the processing element's own MMU, and also issuing 1102 a PATI command to the cache control circuitry. The PATI command—an example of a PATI request—may be issued by writing the command to a command queue in memory (e.g. a region of memory accessible to the cache control circuitry), or by issuing the command on the memory system interconnect 130.

Figure 12:
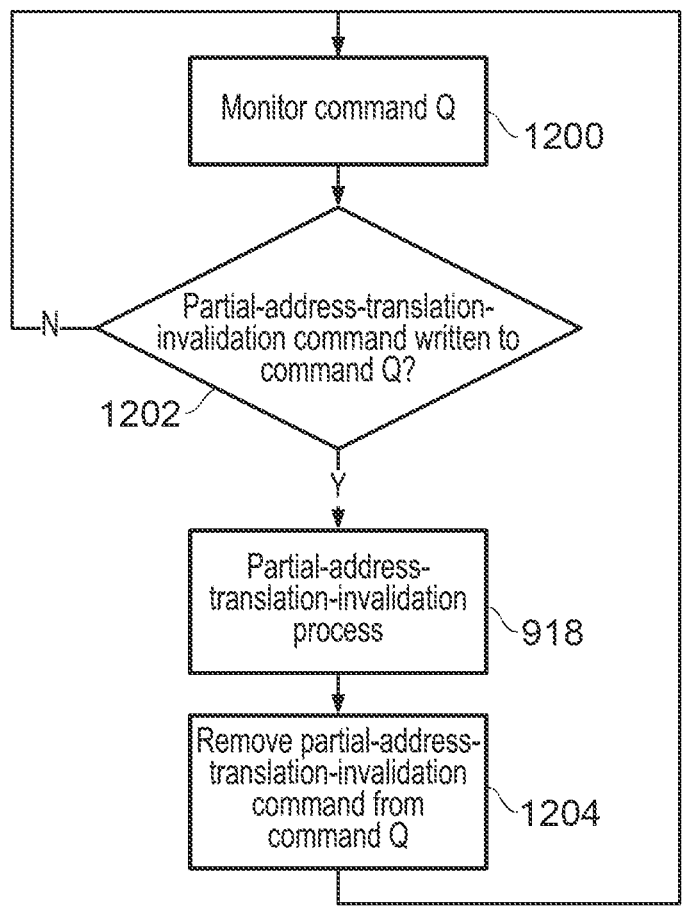
FIG. 12 is a flow diagram showing how cache control circuitry may be triggered to perform a partial-address-translation-invalidation process in response to detecting a partial-address-translation-invalidation command in a command queue.

FIG. 12 shows how the cache control circuitry may receive a PATI command via the command queue. For example, the cache control circuitry may monitor 1200 the command queue for updates, in order to determine 1202 when a PATI command has been written to the command queue. When it is determined that the PATI command has been written to the command queue, the cache control circuitry performs the PATI process 918, and removes 1204 the PATI command from the command queue.

Figure 13:
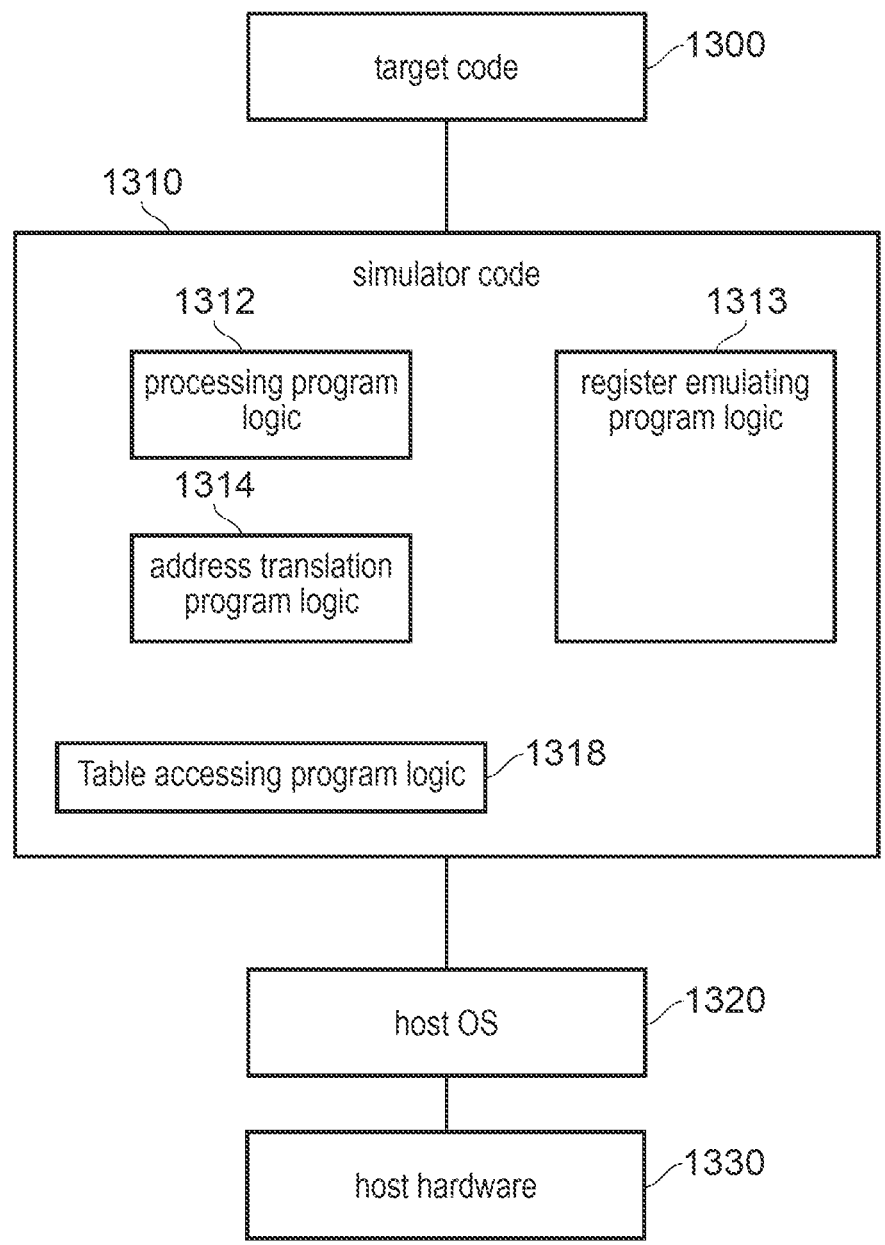
FIG. 13 shows how the hardware of the present technique may be emulated in simulator code.

FIG. 13 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1330, optionally running a host operating system 1320, supporting the simulator program 1310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. For example, this could include processing program logic 1312 to emulate processing circuitry 108, address translation program logic 1314 to emulate address translation circuitry 112, 540 and table accessing program logic 1318 to emulate page table walk circuitry. Similarly, memory hardware, such as a register or cache, may be implemented in a simulated embodiment as a software data structure, and register emulating logic 1313 may be provided to control emulation of registers. For example, the address translation cache 114, 124, 550 may be implemented as a software data structure. In arrangements where one or more of the hardware elements referenced in the previously described embodiments are present on the host hardware (for example, host processor 1330), some simulated embodiments may make use of the host hardware, where suitable.

The simulator program 1310 may be stored on a computer-readable storage medium (which may be a transitory or a non-transitory medium), and provides a program interface (instruction execution environment) to the target code 1300 (which may include applications, operating systems and a hypervisor) which is the same as the interface of the hardware architecture being modelled by the simulator program 1310. Thus, the program instructions of the target code 1300, which may, in some embodiments, include the PATI instruction described above, may be executed from within the instruction execution environment using the simulator program 1310, so that a host computer 1330 which does not actually have the hardware features of the apparatus 1022 discussed above can emulate these features.

For example, a software-maintained address translation cache may be provided to cache translation data, giving faster access to partial/full translations than if a full page table walk process (e.g. as shown in FIG. 8) were performed. This software-maintained cache is a data structure maintained by the address translation program logic 1314 in host memory by the simulator program to emulate a TLB that would be provided in a hardware embodiment, to provide reduced latency for address translations by storing a subset of the address translation data represented by the multi-level page table structure, and by being a flat table. Then, according to examples of the present technique, cache control program logic (which can be considered part of the address translation program logic 1314) invalidates partial translations from the software-maintained cache structure when the PATI request (which could be in the form of a PATI instruction, or could be indirectly requested e.g. by requesting a write of a PATI command to a command queue) is encountered in the target code.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The present technique can further be understood from the following examples:

(1) An apparatus comprising:
an address translation cache comprising a plurality of cache entries, each cache entry to store address translation data dependent on one or more page table entries of a multi-level page table structure in memory, wherein each page table entry of the multi-level page table structure is useable as at least one of:
a branch page table entry that specifies a table address of a next level page table; and
a leaf page table entry that specifies an output address for an address translation mapping for a corresponding region of address space; and
cache control circuitry responsive to a partial-address-translation-invalidation request to:
perform an invalidation lookup operation to identify whether a given cache entry of the address translation cache is a target cache entry to be invalidated, wherein the target cache entry comprises a cache entry for which the address translation data comprises partial address translation data indicative of an address of the next level page table specified by the table address of a target page table entry when used as the branch page table entry; and
trigger an invalidation of the given cache entry when the given cache entry is identified to be the target cache entry,
said partial-address-translation-invalidation request indicating that the given cache entry is permitted to be retained when the given cache entry provides full address translation data indicative of an address of the corresponding region of address space corresponding to the output address specified by the target page table entry when used as the leaf page table entry.

(2) The apparatus of clause (1), wherein
the partial-address-invalidation request specifies a table-level identifier indicative of a subset of page table levels of the multi-level page table structure, and the target page table entry comprises a page table entry at one of the subset of page table levels specified by the table-level identifier.

(3) The apparatus of any preceding clause, comprising processing circuitry responsive to a partial-address-translation-invalidation instruction to issue the partial-address-translation-invalidation request.

(4) The apparatus of any preceding clause, wherein
the partial-address-translation-invalidation request comprises a write request requesting writing of a partial-address-translation-invalidation command to a region of memory accessible to the cache control circuitry.

(5) The apparatus of any preceding clause, wherein
the cache control circuitry is configured to detect a partial-address-translation-invalidation command issued on a memory system interconnect, wherein the partial-address-translation-invalidation request comprises the partial-address-translation-invalidation command.

(6) The apparatus of any preceding clause, comprising
page table walk circuitry responsive to an input address to look up, based on a given table address and an index portion of the input address, a given page table entry in the multi-level page table structure,
the page table walk circuitry being configured to determine a size of the index portion to be used for at least one level of the multi-level page table structure in dependence on whether a table merge indication is set.

(7) The apparatus of any preceding clause, wherein
the partial-address-translation-invalidation request specifies target address information corresponding to the target page table entry.

(8) The apparatus of clause (7), wherein
the cache control circuitry is responsive to the partial-address-translation-invalidation request to perform a prefetch operation to prefetch updated partial address translation data corresponding to the target address information.

(9) The apparatus of clause (8), wherein
the cache control circuitry is configured to restrict the prefetch operation to prefetching of updated partial address translation data for an address corresponding to an invalidated cache entry invalidated in response to the partial-address-invalidation request.

(10) The apparatus of any of clauses (7) to (9), wherein
the address translation mapping is between an input address in an input address space and the output address in an output address space; and
the target address information comprises input address information.

(11) The apparatus of any of clauses (7) to (9), wherein the address translation mapping is between an input address in an input address space and the output address in an output address space; the target address information comprises an address in the output address space or a further address space translated from the output address space.

(12) The apparatus of any of clauses (7) to (11), wherein the target address information comprises a target range of addresses capable of spanning multiple pages.

(13) The apparatus of any preceding clause, wherein: the partial-address-translation-invalidation request specifies a context identifier; and the cache control circuitry is configured to identify the target cache entry in dependence on the context identifier.

(14) The apparatus of clause (13), wherein the context identifier is indicative of least one of: a virtual machine identifier; an address space identifier; and a security state.

(15) The apparatus of any preceding clause, wherein the partial address translation data is indicative of one of: the address of the next level page table; and a further address translated from the address of the next level page table.

(16) The apparatus of any preceding clause, wherein the full address translation data is indicative of one of: the output address; and a further address translated from the output address.

(17) A method comprising: storing, in each of a plurality of cache entries of an address translation cache, address translation data dependent on one or more page table entries of a multi-level page table structure in memory, wherein each page table entry of the multi-level page table structure is useable as one of: a branch page table entry that specifies a table address of a next level page table; and a leaf page table entry that specifies an output address for an address translation mapping for a corresponding region of address space; and in response to a partial-address-translation-invalidation request: performing an invalidation lookup operation to identify whether a given cache entry of the address translation cache is a target cache entry to be invalidated, wherein the target cache entry comprises a cache entry for which the address translation data comprises partial address translation data indicative of an address of the next level page table specified by the table address of a target page table entry when it is used as the branch page table entry; and triggering an invalidation of the given cache entry when the given cache entry is identified to be the target cache entry, said partial-address-translation-invalidation request indicating that the given cache entry is permitted to be retained when the given cache entry provides full address translation data indicative of an address of the corresponding region of address space corresponding to the output address specified by the target page table entry when it is used as the leaf page table entry.

(18) A computer program comprising instructions which, when executed on a host data processing apparatus, control the host data processing apparatus to provide: address translation program logic to perform address translations based on a multi-level page table structure in memory, the address translation logic being configured to maintain an address translation data structure comprising a plurality of data structure entries, each data structure entry to store address translation data dependent on one or more page table entries of the multi-level page table structure, wherein each page table entry of the multi-level page table structure is useable as at least one of: a branch page table entry that specifies a table address of a next level page table entry; and a leaf page table entry that specifies an output address for an address translation mapping for a corresponding region of address space; and control program logic responsive to a partial-address-translation-invalidation request to: perform an invalidation lookup operation to identify whether a given data structure entry of the address translation data structure is a target data structure entry to be invalidated, wherein the target data structure entry comprises a data structure entry for which the address translation data comprises partial address translation data indicative of an address of the next level page table specified by the table address of a target page table entry when it is used as the branch page table entry; and trigger an invalidation of the given data structure entry when the given data structure entry is identified to be the target data structure entry, said partial-address-translation-invalidation request indicating that the given data structure entry is permitted to be retained when the given data structure entry provides full address translation data indicative of an address of the corresponding region of address space corresponding to the output address specified by the target page table entry when it is used as the leaf page table entry.

(19) A computer-readable storage medium storing the computer program of clause (18).

I claim:

1. An apparatus comprising:
an address translation cache comprising a plurality of cache entries, each cache entry to store address translation data dependent on one or more page table entries of a multi-level page table structure in memory, wherein each page table entry of the multi-level page table structure is usable as at least one of:
a branch page table entry that specifies a table address of a next level page table; and
a leaf page table entry that specifies an output address for an address translation mapping for a corresponding region of address space; and
cache control circuitry responsive to a partial-address-translation-invalidation request to:
perform an invalidation lookup operation to identify whether a given cache entry of the address translation cache is a target cache entry to be invalidated, wherein the target cache entry comprises a cache entry for which the address translation data comprises partial address translation data indicative of an address of the next level page table specified by the table address of a target page table entry when used as the branch page table entry; and
trigger an invalidation of the given cache entry when the given cache entry is identified to be the target cache entry, said partial-address-translation-invalidation request indicating that the given cache entry is permitted to be retained when the given cache entry provides full address translation data indicative of an address of the corresponding region of address space corresponding to the output address specified by the target page table entry when used as the leaf page table entry.

2. The apparatus of claim 1, wherein
the partial-address-translation-invalidation request specifies a table-level identifier indicative of a subset of page table levels of the multi-level page table structure, and the target page table entry comprises a page table entry at one of the subset of page table levels specified by the table-level identifier.

3. The apparatus of claim 1, comprising
processing circuitry responsive to a partial-address-translation-invalidation instruction to issue the partial-address-translation-invalidation request.

4. The apparatus of claim 1, wherein
the partial-address-translation-invalidation request comprises a write request requesting writing of a partial-address-translation-invalidation command to a region of memory accessible to the cache control circuitry.

5. The apparatus of claim 1, wherein
the cache control circuitry is configured to detect a partial-address-translation-invalidation command issued on a memory system interconnect, wherein the partial-address-translation-invalidation request comprises the partial-address-translation-invalidation command.

6. The apparatus of claim 1, comprising
page table walk circuitry responsive to an input address to look up, based on a given table address and an index portion of the input address, a given page table entry in the multi-level page table structure,
the page table walk circuitry being configured to determine a size of the index portion to be used for at least one level of the multi-level page table structure in dependence on whether a table merge indication is set.

7. The apparatus of claim 1, wherein
the partial-address-translation-invalidation request specifies target address information corresponding to the target page table entry.

8. The apparatus of claim 7, wherein
the cache control circuitry is responsive to the partial-address-translation-invalidation request to perform a prefetch operation to prefetch updated partial address translation data corresponding to the target address information.

9. The apparatus of claim 8, wherein
the cache control circuitry is configured to restrict the prefetch operation to prefetching of updated partial address translation data for an address corresponding to an invalidated cache entry invalidated in response to the partial-address-translation-invalidation request.

10. The apparatus of claim 7, wherein
the address translation mapping is between an input address in an input address space and the output address in an output address space; and
the target address information comprises input address information.

11. The apparatus of claim 7, wherein
the address translation mapping is between an input address in an input address space and the output address in an output address space;

the target address information comprises an address in the output address space or a further address space translated from the output address space.

12. The apparatus of claim 7, wherein
the target address information comprises a target range of addresses capable of spanning multiple pages.

13. The apparatus of claim 1, wherein:
the partial-address-translation-invalidation request specifies a context identifier; and
the cache control circuitry is configured to identify the target cache entry in dependence on the context identifier.

14. The apparatus of claim 13, wherein the context identifier is indicative of least one of:
a virtual machine identifier;
an address space identifier; and
a security state.

15. The apparatus of claim 1, wherein the partial address translation data is indicative of one of:
the address of the next level page table; and
a further address translated from the address of the next level page table.

16. The apparatus of claim 1, wherein the full address translation data is indicative of one of:
the output address; and
a further address translated from the output address.

17. A method comprising:
storing, in each of a plurality of cache entries of an address translation cache, address translation data dependent on one or more page table entries of a multi-level page table structure in memory, wherein each page table entry of the multi-level page table structure is useable as at least one of:
a branch page table entry that specifies a table address of a next level page table; and
a leaf page table entry that specifies an output address for an address translation mapping for a corresponding region of address space; and
in response to a partial-address-translation-invalidation request:
performing an invalidation lookup operation to identify whether a given cache entry of the address translation cache is a target cache entry to be invalidated, wherein the target cache entry comprises a cache entry for which the address translation data comprises partial address translation data indicative of an address of the next level page table specified by the table address of a target page table entry when used as the branch page table entry; and
triggering an invalidation of the given cache entry when the given cache entry is identified to be the target cache entry,
said partial-address-translation-invalidation request indicating that the given cache entry is permitted to be retained when the given cache entry provides full address translation data indicative of an address of the corresponding region of address space corresponding to the output address specified by the target page table entry when used as the leaf page table entry.

18. A non-transitory computer-readable storage medium storing a computer program comprising instructions which, when executed on a host data processing apparatus, control the host data processing apparatus to provide:
address translation program logic to perform address translations based on a multi-level page table structure in memory, the address translation logic being configured to maintain an address translation data structure comprising a plurality of data structure entries, each data structure entry to store address translation data dependent on one or more page table entries of the multi-level page table structure, wherein each page table entry of the multi-level page table structure is useable as at least one of:
- a branch page table entry that specifies a table address of a next level page table entry; and
- a leaf page table entry that specifies an output address for an address translation mapping for a corresponding region of address space; and control program logic responsive to a partial-address-translation-invalidation request to:
- perform an invalidation lookup operation to identify whether a given data structure entry of the address translation data structure is a target data structure entry to be invalidated, wherein the target data structure entry comprises a data structure entry for which the address translation data comprises partial address translation data indicative of an address of the next level page table specified by the table address of a target page table entry when used as the branch page table entry; and
- trigger an invalidation of the given data structure entry when the given data structure entry is identified to be the target data structure entry, said partial-address-translation-invalidation request indicating that the given data structure entry is permitted to be retained when the given data structure entry provides full address translation data indicative of an address of the corresponding region of address space corresponding to the output address specified by the target page table entry when used as the leaf page table entry.

* * * * *